US008158711B2

(12) United States Patent
Moncla et al.

(10) Patent No.: US 8,158,711 B2
(45) Date of Patent: *Apr. 17, 2012

(54) AQUEOUS DISPERSION, ITS PRODUCTION METHOD, AND ITS USE

(75) Inventors: Brad M. Moncla, Lake Jackson, TX (US); Matthew J. Kalinowski, Freeland, MI (US); David R. Speth, Upper Arlington, OH (US); Charles F. Diehl, Blue Bell, PA (US); Dale C. Schmidt, Midland, MI (US); Kevin D. Maak, Midland, MI (US); Timothy J. Young, Bay City, MI (US); David J. Magley, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 142 days.

This patent is subject to a terminal disclaimer.

(21) Appl. No.: 12/635,569

(22) Filed: Dec. 10, 2009

(65) Prior Publication Data

US 2010/0137501 A1 Jun. 3, 2010

Related U.S. Application Data

(63) Continuation-in-part of application No. 12/559,056, filed on Sep. 14, 2009, which is a continuation of application No. 10/925,693, filed on Aug. 25, 2004, now Pat. No. 7,803,865.

(60) Provisional application No. 60/497,527, filed on Aug. 25, 2003, provisional application No. 60/548,493, filed on Feb. 27, 2004.

(51) Int. Cl.
*C08L 73/00* (2006.01)
*C08G 18/42* (2006.01)

(52) U.S. Cl. .................................... 524/539; 524/599
(58) Field of Classification Search .................. 524/539, 524/599
See application file for complete search history.

(56) References Cited

U.S. PATENT DOCUMENTS

| 3,166,613 A | 1/1965 | Wright et al. |
| 3,245,934 A | 4/1966 | Krzyszkowski |
| 3,378,056 A * | 4/1968 | Robertson ..................... 152/451 |
| 3,422,049 A | 1/1969 | McClain |
| 3,432,483 A | 3/1969 | Peoples et al. |
| 3,456,044 A | 7/1969 | Heinz E. Pahlke |
| 3,554,994 A | 1/1971 | Maloney et al. |
| 3,590,000 A | 6/1971 | Palermiti et al. |
| 3,645,992 A | 2/1972 | Elston |
| 3,741,253 A | 6/1973 | Brax et al. |
| 3,746,681 A | 7/1973 | McClain |
| 3,910,840 A | 10/1975 | Adam |
| 4,038,477 A | 7/1977 | Inoue et al. |
| 4,076,698 A | 2/1978 | Anderson et al. |
| 4,352,849 A | 10/1982 | Mueller |
| 4,542,199 A | 9/1985 | Kaminsky et al. |
| 4,543,399 A | 9/1985 | Jenkins, III et al. |
| 4,551,380 A | 11/1985 | Schoenberg |
| 4,588,790 A | 5/1986 | Jenkins, III et al. |
| 4,597,920 A | 7/1986 | Golike |
| 4,599,392 A | 7/1986 | McKinney et al. |
| 4,689,351 A | 8/1987 | Endo et al. |
| 4,749,616 A | 6/1988 | Liu et al. |
| 4,752,597 A | 6/1988 | Turner |
| 4,798,081 A | 1/1989 | Hazlitt et al. |
| 4,808,561 A | 2/1989 | Welborn, Jr. |
| 4,818,785 A | 4/1989 | Otawa et al. |
| 4,820,557 A | 4/1989 | Warren |
| 4,837,084 A | 6/1989 | Warren |
| 4,865,902 A | 9/1989 | Golike et al. |
| 4,871,705 A | 10/1989 | Hoel |
| 4,897,455 A | 1/1990 | Welborn, Jr. |
| 4,912,075 A | 3/1990 | Chang |
| 4,927,708 A | 5/1990 | Herran et al. |
| 4,937,217 A | 6/1990 | Chang |
| 4,937,301 A | 6/1990 | Chang |
| 4,952,451 A | 8/1990 | Mueller |
| 4,963,419 A | 10/1990 | Lustig et al. |
| 4,988,781 A | 1/1991 | McKinney et al. |
| 4,996,259 A | 2/1991 | Koehler et al. |
| 5,008,288 A | 4/1991 | Stracher et al. |
| 5,017,714 A | 5/1991 | Welborn, Jr. |
| 5,028,670 A | 7/1991 | Chinh et al. |
| 5,059,481 A | 10/1991 | Lustig et al. |
| 5,086,025 A | 2/1992 | Chang |
| 5,120,867 A | 6/1992 | Welborn, Jr. |
| 5,132,262 A | 7/1992 | Rieger et al. |

(Continued)

FOREIGN PATENT DOCUMENTS

DE 4428382 A1 2/1996

(Continued)

OTHER PUBLICATIONS

International Search Report (PCT/US2004/027641).
International Search Report (PCT/US2005/006493).
Randall, James C., A Review of High Resolution Liquid $^{13}$Carbon Nuclear Magnetic Resonance Characterizations of Ethylene-Based Polymers, JMS-REV. Macromol. Chem. Phys., 1989, pp. 201-317, C29 (2&3), Baytown Polymers Center, Baytown Texas.

(Continued)

*Primary Examiner* — William Cheung

(57) ABSTRACT

Aqueous dispersions including at least one thermoplastic resin; at least one dispersing agent; and water; wherein the dispersion has a pH of less than 12 are disclosed along with dispersions including at least one thermoplastic resin; at least one dispersing agent; and water wherein the dispersion has a volume average particle size of less than about 5 μm. Some dispersions include less than about 4 percent by weight of the dispersing agent based on the weight of the thermoplastic resin. Other dispersions include at least one propylene-rich alpha-olefin interpolymer; at least one dispersing agent; and water. Methods of making such dispersions are also described.

2 Claims, 1 Drawing Sheet

U.S. PATENT DOCUMENTS

| | | |
|---|---|---|
| 5,147,949 A | 9/1992 | Chang |
| 5,198,401 A | 3/1993 | Turner et al. |
| 5,210,154 A * | 5/1993 | Weidemeier et al. ......... 525/438 |
| 5,228,531 A | 7/1993 | Patterson et al. |
| 5,238,892 A | 8/1993 | Chang |
| 5,243,001 A | 9/1993 | Winter et al. |
| 5,272,236 A | 12/1993 | Lai et al. |
| 5,278,119 A | 1/1994 | Turner et al. |
| 5,278,264 A | 1/1994 | Spaleck et al. |
| 5,278,272 A | 1/1994 | Lai et al. |
| 5,290,654 A | 3/1994 | Sacripante et al. |
| 5,296,434 A | 3/1994 | Karl et al. |
| 5,304,614 A | 4/1994 | Winter et al. |
| 5,308,734 A | 5/1994 | Sacripante et al. |
| 5,324,800 A | 6/1994 | Welborn, Jr. et al. |
| 5,348,832 A | 9/1994 | Sacripante et al. |
| 5,360,648 A | 11/1994 | Falla et al. |
| 5,364,486 A | 11/1994 | Falla et al. |
| 5,370,963 A | 12/1994 | Patel et al. |
| 5,387,568 A | 2/1995 | Ewen et al. |
| 5,391,629 A | 2/1995 | Turner et al. |
| 5,504,172 A | 4/1996 | Imuta et al. |
| 5,539,021 A | 7/1996 | Pate et al. |
| 5,545,504 A | 8/1996 | Keoshkerian et al. |
| 5,574,091 A | 11/1996 | Walther et al. |
| 5,593,807 A | 1/1997 | Sacripante et al. |
| 5,648,193 A | 7/1997 | Patel et al. |
| 5,658,704 A | 8/1997 | Patel et al. |
| 5,660,965 A | 8/1997 | Mychajlowskij et al. |
| 5,677,383 A | 10/1997 | Chum et al. |
| 5,721,025 A | 2/1998 | Falla et al. |
| 5,756,659 A | 5/1998 | Hughes et al. |
| 5,798,410 A | 8/1998 | Walther et al. |
| 5,840,462 A | 11/1998 | Foucher et al. |
| 5,844,045 A | 12/1998 | Kolthammer et al. |
| 5,853,944 A | 12/1998 | Foucher et al. |
| 5,869,575 A | 2/1999 | Kolthammer et al. |
| 5,874,139 A | 2/1999 | Bosiers et al. |
| 5,879,768 A | 3/1999 | Falla et al. |
| 5,938,437 A | 8/1999 | DeVincenzo |
| 5,942,579 A | 8/1999 | Falla et al. |
| 5,945,245 A | 8/1999 | Mychajlowskij et al. |
| 6,111,023 A | 8/2000 | Chum et al. |
| 6,117,465 A | 9/2000 | Falla et al. |
| 6,130,266 A | 10/2000 | Mihayashi et al. |
| 6,221,191 B1 | 4/2001 | Davis et al. |
| 6,235,143 B1 | 5/2001 | Crighton et al. |
| 6,316,549 B1 | 11/2001 | Chum et al. |
| 6,339,123 B1 | 1/2002 | Raetzsch et al. |
| 6,359,105 B1 | 3/2002 | Ianni et al. |
| 6,387,581 B1 | 5/2002 | Moffat et al. |
| 6,395,445 B1 | 5/2002 | Toth et al. |
| 6,448,341 B1 | 9/2002 | Kolthammer et al. |
| 6,448,621 B1 | 9/2002 | Thakur |
| 6,455,636 B2 | 9/2002 | Sanada |
| 6,525,157 B2 | 2/2003 | Cozewith et al. |
| 6,538,070 B1 | 3/2003 | Cardwell et al. |
| 6,566,446 B1 | 5/2003 | Parikh et al. |
| 6,767,956 B2 | 7/2004 | Choudhery et al. |
| 6,777,096 B2 | 8/2004 | Shiba et al. |
| 6,960,635 B2 | 11/2005 | Stevens et al. |
| 7,494,757 B2 | 2/2009 | Sacripante et al. |
| 7,498,112 B2 | 3/2009 | Sweeney |
| 7,521,166 B2 | 4/2009 | Sata et al. |
| 7,524,599 B2 | 4/2009 | Vanbesien et al. |
| 7,528,218 B2 | 5/2009 | Shirai et al. |
| 7,803,865 B2 * | 9/2010 | Moncla et al. ................ 524/523 |
| 2001/0011118 A1 | 8/2001 | Sanada |
| 2002/0146509 A1 | 10/2002 | Kodokian et al. |
| 2003/0157354 A1 | 8/2003 | Van Veghel et al. |
| 2003/0158341 A1 | 8/2003 | Walton |
| 2003/0204017 A1 | 10/2003 | Stevens et al. |
| 2003/0232268 A1 | 12/2003 | Sacripante et al. |
| 2004/0024094 A1 | 2/2004 | Stemmler |
| 2004/0027593 A1 | 2/2004 | Wilkins |
| 2004/0242784 A1 | 12/2004 | Tau et al. |
| 2005/0100754 A1 | 5/2005 | Moncla et al. |
| 2005/0271888 A1 | 12/2005 | Moncla et al. |
| 2005/0271965 A1 | 12/2005 | Kamiyoshi et al. |
| 2006/0211781 A1 | 9/2006 | Strandburg et al. |
| 2006/0223934 A1 | 10/2006 | Chen et al. |
| 2007/0088119 A1 | 4/2007 | Kamiyoshi et al. |
| 2007/0212628 A1 | 9/2007 | Ishikawa |
| 2007/0219313 A1 | 9/2007 | Mizuhata et al. |
| 2007/0292705 A1 | 12/2007 | Moncla et al. |
| 2008/0006311 A1 | 1/2008 | Brown et al. |
| 2008/0318145 A1 | 12/2008 | Hu et al. |
| 2009/0000791 A1 | 1/2009 | Ice |
| 2009/0011745 A1 | 1/2009 | Cha |
| 2009/0017393 A1 | 1/2009 | Moffat et al. |
| 2009/0047591 A1 | 2/2009 | Mcdougall et al. |
| 2009/0047593 A1 | 2/2009 | Vanbesien et al. |
| 2009/0061349 A1 | 3/2009 | Sacripante et al. |
| 2009/0092918 A1 | 4/2009 | Moffat |
| 2009/0117482 A1 | 5/2009 | Shirai et al. |
| 2009/0123862 A1 | 5/2009 | Mang et al. |
| 2009/0123863 A1 | 5/2009 | Ashizawa et al. |
| 2009/0123864 A1 | 5/2009 | Sacripante et al. |
| 2009/0123865 A1 | 5/2009 | Sweeney et al. |

FOREIGN PATENT DOCUMENTS

| | | |
|---|---|---|
| EP | 0277003 A1 | 8/1988 |
| EP | 0277004 A1 | 8/1988 |
| EP | 0426637 A2 | 5/1991 |
| EP | 0427697 A2 | 5/1991 |
| EP | 0495375 A2 | 7/1992 |
| EP | 0520732 A1 | 12/1992 |
| EP | 0525205 A1 | 2/1993 |
| EP | 0573403 A2 | 12/1993 |
| EP | 0696244 A1 | 2/1996 |
| EP | 0718318 A2 | 6/1996 |
| EP | 0760828 A1 | 3/1997 |
| EP | 0972794 A1 | 1/2000 |
| EP | 1035166 A1 | 9/2000 |
| EP | 1312654 A1 | 5/2003 |
| EP | 1394202 A2 | 3/2004 |
| EP | 1482381 A1 | 12/2004 |
| EP | 1482382 A1 | 12/2004 |
| EP | 1736833 A1 | 12/2006 |
| EP | 2012185 A1 | 1/2009 |
| EP | 2015142 A2 | 1/2009 |
| EP | 2026134 A1 | 2/2009 |
| EP | 2028551 A1 | 2/2009 |
| JP | 02-26631 | 1/1990 |
| JP | 05-105791 | 4/1993 |
| JP | 08-20636 | 1/1996 |
| JP | 10-239903 | 9/1998 |
| JP | 11-133668 | 5/1999 |
| WO | WO-9200333 A2 | 1/1992 |
| WO | WO-9523038 A1 | 8/1995 |
| WO | WO-0001745 A1 | 1/2000 |
| WO | WO-0164774 A2 | 9/2001 |
| WO | WO-0206275 A1 | 1/2002 |
| WO | WO-02062875 A1 | 8/2002 |
| WO | WO-02064856 A1 | 8/2002 |
| WO | WO-02081205 A1 | 10/2002 |
| WO | WO-02083753 A1 | 10/2002 |
| WO | WO-03025058 A1 | 3/2003 |
| WO | WO-03027170 A1 | 4/2003 |
| WO | WO-03040201 A1 | 5/2003 |
| WO | WO-03093355 A1 | 11/2003 |
| WO | WO-2005021622 A2 | 3/2005 |
| WO | WO-2005026275 A1 | 3/2005 |
| WO | WO-2005090427 A2 | 9/2005 |

OTHER PUBLICATIONS

Scholte, Th. G., et al., Mark-Houwink Equation and GPC Calibration for Linear Short-Chain Branched Polyolefins, Including Polypropylene and Ethylene-Propylene Copolymers, Journal of Applied Polymer Science, 1984, pp. 3763-3782, vol. 29, John Wiley & Sons, Inc.

Otocka, E.P., et al., Distribution of Long and Short Branches in Low-Denisty Polyethylenes, Macromolecules, 1971, pp. 507-512, vol. 4, No. 4, Bell Telephone Laboratories, New Jersey.

Jenkins, Wilmer, et al., Multi-Layer Films, Packaging Foods with Plastics, 1991, pp. 19-27.

Butler, Thomas I., Coextrusion, Coextrusion Basics, 1992, pp. 31-80, Chapter 4.

Williams, T., et al., The Construction of a Polyethylene calibration Curve for Gel Permeation Chromatography using Polystyrene Fractions, Journal of Polymer Science Polymer Letters, 1968, pp. 621-624, vol. 6.

Wild, L., et al., Determination of Branching Distributions in Polyethylene and Ethylene Copolymers, Journal of Polymer Science, 1982, pp. 441-455, vol. 20.

* cited by examiner

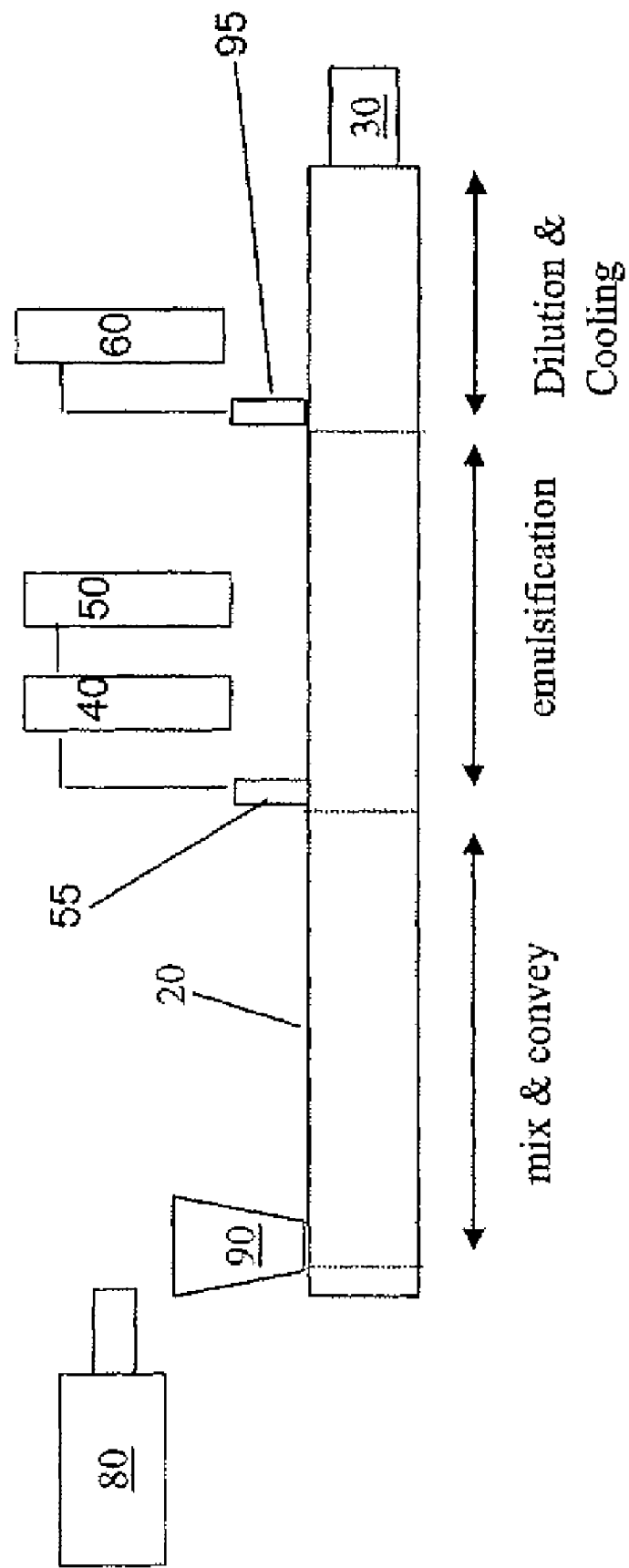

AQUEOUS DISPERSION, ITS PRODUCTION METHOD, AND ITS USE

CROSS-REFERENCE TO RELATED APPLICATIONS

The present application is a continuation-in-part application of the U.S. application Ser. No. 12/559,056, filed on Sep. 14, 2009, entitled "AQUEOUS DISPERSION, ITS PRODUCTION METHOD, AND ITS USE", which is a continuation application of the U.S. patent application Ser. No. 10/925,693, filed on Aug. 25, 2004, entitled "AQUEOUS DISPERSION, ITS PRODUCTION METHOD, AND ITS USE", now U.S. Pat. No. 7,803,865, the teachings of which are incorporated by reference herein, as if reproduced in full hereinbelow, which claims priority to the U.S. Provisional Application Ser. No. 60/497,527, filed on Aug. 25, 2003, entitled "FROTHS AND DURABLE FOAMS OF DISPERSED OLEFIN POLYMERS AND ARTICLES PREPARED FROM SAME," and the U.S. Provisional Application Ser. No. 60/548,493, filed on Feb. 27, 2004, entitled "FROTH AND DURABLE FOAM OF DISPERSED OLEFIN POLYMERS, METHODS OF MAKING FOAM AND ARTICLES PREPARED FROM SAME," the teachings of which are incorporated by reference herein, as if reproduced in full hereinbelow.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

Aqueous dispersions of a thermoplastic resin of various types are known in the art. Aqueous dispersions have been used in a wide variety of fields since an aqueous dispersion prepared by using water as its dispersion medium is far more advantageous than the dispersions prepared by using an organic solvent for the dispersion medium in view of flammability, working environment, handling convenience, and the like. For example, when an aqueous dispersion is coated and dried on a surface of a substrate such as paper, fiber, wood, metal, or plastic molded article, the resin coating formed will provide the substrate with water resistance, oil resistance, chemical resistance, corrosion resistance and heat sealability.

Conventional aqueous dispersions of a thermoplastic resin have been produced either by a process wherein a polymerizable monomer which is the resin raw material is polymerized by emulsion polymerization in an aqueous medium in the presence of a dispersing agent, or by a process wherein a molten thermoplastic resin and an aqueous medium, and optionally, a dispersing agent are mixed by applying shearing force. The former process is associated with the disadvantage of the limited number of the polymerizable monomers that can be used, and hence, the variety of the aqueous dispersions of the thermoplastic resin that can be produced, is limited. The former process also suffers from complicated control of the polymerization reaction as well as intricate equipment. On the other hand, the latter process is applicable to a wide variety of resins in relatively simple equipment.

BRIEF SUMMARY OF THE INVENTION

In one aspect the invention provides an aqueous dispersion comprising (A) at least one thermoplastic resin; (B) at least one dispersing agent; and (C) water; wherein the dispersion has a pH of less than 12. In another aspect the invention provides an aqueous dispersion comprising (A) at least one thermoplastic resin; (B) at least one dispersing agent; and (C) water wherein the dispersion has a volume average particle size of less than about 5 μm. In some dispersions according to either aspect, the dispersing agent comprises less than about 4 percent by weight based on the weight of the thermoplastic resin. In some dispersions having a pH of 12 or less, the dispersion also has a volume average particle size of less than about 5 μm. Some dispersions that have a particle size of less than about 5 μm also have a pH of less than 12. In still other embodiments, the dispersion has a pH of less than 12, and an average particle size of less than about 5 μm, and wherein the dispersing agent comprises less than about 4 percent by weight based on the weight of the thermoplastic resin.

In some dispersions the thermoplastic resin is an alpha-olefin interpolymer of ethylene with at least one comonomer selected from the group consisting of a $C_4$-$C_{20}$ linear, branched or cyclic diene, or an ethylene vinyl compound, such as vinyl acetate, and a compound represented by the formula $H_2C{=}CHR$ wherein R is a $C_1$-$C_{20}$ linear, branched or cyclic alkyl group or a $C6$-$C_{20}$ aryl group. Preferred comonomers include propylene, 1-butene, 3-methyl-1-butene, 4-methyl-1-pentene, 3-methyl-1-pentene, 1-heptene, 1-hexene, 1-octene, 1-decene, and 1-dodecene. In some embodiments, the interpolymer of ethylene has a density of less than about 0.92 g/cc.

In other embodiments, the thermoplastic resin comprises an alpha-olefin interpolymer of propylene with at least one comonomer selected from the group consisting of ethylene, a $C_4$-$C_{20}$ linear, branched or cyclic diene, and a compound represented by the formula $H_2C{=}CHR$ wherein R is a $C_1$-$C_{20}$ linear, branched or cyclic alkyl group or a $C_6$-$C_{20}$ aryl group. Preferred comonomers include ethylene, 1-butene, 3-methyl-1-butene, 4-methyl-1-pentene, 3-methyl-1-pentene, 1-heptene, 1-hexene, 1-octene, 1-decene, and 1-dodecene. In some embodiments, the comonomer is present at about 5% weight percent to about 25% weight percent of the interpolymer. In some embodiments, a propylene-ethylene interpolymer is preferred.

Some interpolymers of propylene that are useful in particular embodiments are propylene-rich alpha-olefin interpolymer comprising 5 to 25% by weight of ethylene-derived units and 95 to 75% by weight of propylene-derived units. In some embodiments, propylene rich alpha-olefin interpolymers having (a) a melting point of less than 90° C.; a relationship of elasticity to 500% tensile modulus such that the elasticity is less than or equal to 0.935M+12, where elasticity is in percent and M is the 500% tensile modulus in MPa; and a relationship of flexural modulus to 500% tensile modulus such that flexural modulus is less than or equal to $4.2e^{0.27M}+50$, where flexural modulus is in MPa and M is the 500% tensile modulus in MPa are preferred. In some embodiments, the propylene rich alpha-olefin interpolymer comprises 6 to 20% by weight of ethylene-derived units and 94 to 80% by weight of propylene-derived units. In other embodiments, polymers comprising 8 to 20% by weight of ethylene-derived units and 92 to 80% by weight of propylene-derived units are preferred. In still other embodiments, polymers comprising 10 to 20% by weight of ethylene-derived units and 90 to 80% by weight of propylene-derived units.

In other embodiments, a propylene-rich alpha-olefin interpolymer that comprises a copolymer of propylene and at least one comonomer selected from the group consisting of ethylene and $C_4$ to $C_{20}$ alpha-olefins, wherein the copolymer has a propylene content of greater than 65 mole percent, a weight average molecular weight (Mw) of from about 15,000 to about 200,000, a weight average molecular weight/number average molecular weight ratio (Mw/Mn) of from about 1.5 to about 4 is preferred.

Some propylene-rich alpha-olefin interpolymers have a heat of fusion of less than about 80 J/g, preferably from about 8 to about 80, or more preferably from about 30 to about 80 J/g as determined by DSC.

In some embodiments, the at least one thermoplastic resin has a crystallinity of less than about 50%. In other embodiments, the crystallinity ranges from about 5% to about 45%, or from about 5% to about 40%.

Any suitable dispersing agent can be used. However, in particular embodiments, the dispersing agent comprises at least one carboxylic acid, a salt of at least one carboxylic acid, or carboxylic acid ester or salt of the carboxylic acid ester. One example of a carboxylic acid useful as a dispersant is a fatty acid such as montanic acid. In some preferred embodiments, the carboxylic acid, the salt of the carboxylic acid, or at least one carboxylic acid fragment of the carboxylic acid ester or at least one carboxylic acid fragment of the salt of the carboxylic acid ester has fewer than 25 carbon atoms. In other embodiments, the carboxylic acid, the salt of the carboxylic acid, or at least one carboxylic acid fragment of the carboxylic acid ester or at least one carboxylic acid fragment of the salt of the carboxylic acid ester has 12 to 25 carbon atoms. In some embodiments, carboxylic acids, salts of the carboxylic acid, at least one carboxylic acid fragment of the carboxylic acid ester or its salt has 15 to 25 carbon atoms are preferred. In other embodiments, the number of carbon atoms is 25 to 60. Some preferred salts comprise a cation selected from the group consisting of an alkali metal cation, alkaline earth metal cation, or ammonium or alkyl ammonium cation.

In still other embodiments, the dispersing agent is selected from the group consisting of ethylene carboxylic acid polymers, and their salts, such as ethylene acrylic acid copolymers or ethylene methacrylic acid copolymers.

In other embodiments, the dispersing agent is selected from alkyl ether carboxylates, petroleum sulfonates sulfonated polyoxyethylenated alcohol, sulfated or phosphated polyoxyethylenated alcohols, polymeric ethylene oxide/propylene oxide/ethylene oxide dispersing agents, primary and secondary alcohol ethoxylates, alkyl glycosides and alkyl glycerides.

Combinations any of the above-enumerated dispersing agents can also be used to prepared some aqueous dispersions.

Some dispersions described herein have an advantageous particle size distribution. In particular embodiments, the dispersion has a particle size distribution defined as volume average particle diameter (Dv) divided by number average particle diameter (Dn) of less than or equal to about 2.0. In other embodiments, the dispersion has a particle size distribution of less than or equal to about less than 1.5.

Some dispersions described herein comprise particles having an average particle size of less than about 1.5 µm. In other embodiments, the average particle size ranges from about 0.05 µm to about 1.5 µm. In still other embodiments, the average particle size of the dispersion ranges from about 0.5 µm to about 1.5 µm.

For dispersions having a pH of less than 12, some dispersions have a pH of from about 5 to about 11.5, preferably from about 7 to about 11, more preferably from about 9 to about 11. The pH can be controlled by a number of factors, including type or strength of base (dispersing agent), degree of conversion of the base to the salt form, type of thermoplastic polymer to be dispersed, and melt kneading (e.g., extruder) processing conditions. The pH can be adjusted either in-situ, or by converting the carboxylic acid dispersing agent to the salt form before adding it to the thermoplastic resin and forming the dispersion. Of these, forming the salt in-situ is preferred.

Preferably, the dispersions are characterized by a percent solids content of less than about 74% by volume. Some dispersions have a percent solids of from about 5% to about 74% by volume. Still other dispersions have a percent solids of less than about 70% by volume, less than about 65% by volume, or from about 5% to about 50% by volume.

In another aspect embodiments of the invention provide a method for producing an aqueous dispersion comprising: (1) melt kneading (A) at least one thermoplastic resin and (B) at least one dispersing agent, to produce a melt-kneaded product and (2) diluting said melt-kneaded product, and melt kneading the resulting mixture to form the aqueous dispersion, wherein the dispersion has an average particle size of less than about 5 µm. Other embodiments provide a method for producing an aqueous dispersion comprising: (1) melt kneading (A) at least one thermoplastic resin and (B) at least one dispersing agent, to produce a melt-kneaded product and (2) diluting said melt-kneaded product, and melt kneading the resulting mixture to form the aqueous dispersion to produce a dispersion having a pH of less than 12. In some methods according to either aspect, the dispersing agent comprises less than about 4 percent by weight based on the weight of the thermoplastic resin. In some methods that provide a dispersion having a pH of 12 or less, the dispersion also has a volume average particle size of less than about 5 µm. Some dispersions that have a particle size of less than about 5 µm also have a pH of less than 12. Embodiments of the methods use the thermoplastic resins and dispersing agents described above. And in some embodiments, the methods provide dispersions having one or more of the properties described above.

In another aspect, embodiments of the invention provide an aqueous dispersion comprising (A) at least one propylene-rich alpha-olefin interpolymer; (B) at least one dispersing agent; and (C) water. On preferred alpha-olefin is ethylene, preferably present in an amount of from about 5% to about 25% by weight. In some embodiments of the invention according to this aspect the propylene-rich alpha-olefin interpolymer is characterized as having an isotactic triad (mm) measured by $^{13}C$ NMR of greater than about 0.85. Some such propylene-rich alpha-olefin interpolymer comprise 5 to 25% by weight of ethylene-derived units and 95 to 75% by weight of propylene-derived units. Additionally, some propylene-rich alpha-olefin interpolymers have (a) a melting point of less than 90° C.; (b) a relationship of elasticity to 500% tensile modulus such that the elasticity is less than or equal to 0.935M+12, where elasticity is in percent and M is the 500% tensile modulus in MPa; and (c) a relationship of flexural modulus to 500% tensile modulus such that flexural modulus is less than or equal to $4.2e^{0.27M}+50$, where flexural modulus is in MPa and M is the 500% tensile modulus in MPa. In some embodiments, the propylene rich alpha-olefin interpolymer comprises 6 to 20% by weight of ethylene-derived units and 94 to 80% by weight of propylene-derived units. In other embodiments, polymers comprising 8 to 20% by weight of ethylene-derived units and 92 to 80% by weight of propylene-derived units are preferred. In still other embodiments, polymers comprising 10 to 20% by weight of ethylene-derived units and 90 to 80% by weight of propylene-derived units.

In other embodiments, a propylene-rich alpha-olefin interpolymer that comprises a copolymer of propylene and at least one comonomer selected from the group consisting of ethylene and $C_4$ to $C_{20}$ alpha-olefins, wherein the copolymer has a propylene content of greater than 65 mole percent, a weight average molecular weight (Mw) of from about 15,000 to about 200,000, a weight average molecular weight/number average molecular weight ratio (Mw/Mn) of from about 1.5 to about 4.

Some thermoplastic resins or propylene-rich alpha-olefin interpolymers used in this aspect have a heat of fusion of less than about 80 J/g, preferably from about 8 to about 80, or more preferably from about 30 to about 80 J/g as determined by DSC.

In some embodiments, the propylene-rich alpha-olefin interpolymer has a crystallinity of less than about 50%. In other embodiments, the crystallinity ranges from about 5% to about 45%, or from about 5% to about 40%.

In still other embodiments, the propylene-rich interpolymer has a flexural modulus, measured in accordance with ASTM D-790-97, of less than about 50 kpsi, preferably less than about 40 kpsi, more preferably less than about 30 kpsi. In some dispersions, polymers having lower value for the flexural modulus are preferred. For example, some polymers have a flexural modulus of about 2 to about 15 kpsi, particularly about 4 to about 10 kpsi.

Propylene-rich interpolymers or thermoplastic resins with a melting point of less than about 140° C., preferably less than about 130° C., more preferably less than about 120° C. are used. In some preferred embodiments, the propylene-rich interpolymer or thermoplastic resin has a melting point of less than about 90° C.

Any suitable dispersing agent can be used in embodiments of this aspect of the invention. However, in particular embodiments, the dispersing agent comprises at least one carboxylic acid, a salt of at least one carboxylic acid, carboxylic acid ester or salt of a carboxylic acid ester. In some preferred embodiments, the carboxylic acid, the salt of the carboxylic acid, at least one carboxylic acid fragment of the carboxylic acid ester or its salt has fewer than 25 carbon atoms. In other embodiments, such moieties have 12 to 25 carbon atoms. In some embodiments, 15 to 25 carbon atoms are preferred. In other embodiments, the dispersing agent comprises at least one carboxylic acid, the salt of the at least one carboxylic acid, at least one carboxylic acid fragment of the carboxylic acid ester or its salt that has 25 to 60 carbon atoms. Some preferred salts comprises a cation selected from the group consisting of an alkali metal cation, alkaline earth metal cation, or ammonium or alkyl ammonium cation.

In still other embodiments, the dispersing agent is selected from the group consisting of ethylene acid polymers such as ethylene acrylic acid copolymers or ethylene methacrylic acid copolymers.

In other embodiments, the dispersing agent is selected from alkyl ether carboxylates, petroleum sulfonates sulfonated polyoxyethylenated alcohol, sulfated or phosphated polyoxyethylenated alcohols, polymeric ethylene oxide/propylene oxide/ethylene oxide dispersing agents, primary and secondary alcohol ethoxylates, alkyl glycosides and alkyl glycerides.

Combinations any of the above-enumerated dispersing agents can also be used to prepared some aqueous dispersions.

Some dispersions described herein have an advantageous particle size distribution. In particular embodiments, the dispersion has a particle size distribution defined as volume average particle diameter (Dv) divided by number average particle diameter (Dn) of less than or equal to about 2.0. In other embodiments, the dispersion has a particle size distribution of less than or equal to about less than 1.5.

Some dispersions described herein comprise particles having a volume average particle size of less than about 1.5 μm. In other embodiments, the average particle size ranges from about 0.05 μm to about 1.5 μm. In still other embodiments, the average particle size of the dispersion ranges from about 0.5 μm to about 1.5 μm.

For dispersions having a pH of less than 12, some dispersions have a pH of from about 5 to about 11.5, preferably from about 7 to about 11, more preferably from about 9 to about 11.

Preferably, the dispersions are characterized by a percent solids content of less than about 74% by volume. Some dispersions have a percent solids of from about 5% to about 74% by volume. Still other dispersions have a percent solids of less than about 70% by volume, less than about 65% by volume, or from about 5% to about 50% by volume.

In another aspect, embodiments of the invention provide a method for producing an aqueous dispersion comprising: (1) melt kneading (A) at least one at least one propylene-rich alpha-olefin interpolymer, (B) at least one dispersing agent, to form a melt-kneaded product; and (2) diluting said melt-kneaded product, and melt kneading the resulting mixture to form the aqueous dispersion. In particular embodiments, the method includes diluting the melt kneaded product to provide a dispersion having a pH of less than 12. Some methods provide a dispersion with an average particle size of less than about 5 μm. In still other embodiments, the method provides a dispersion that comprises less than 4 percent by weight of the dispersing agent based on the weight of the polymer. Embodiments of the methods use the thermoplastic resins and dispersing agents described above. And in some embodiments, the methods provide dispersions having on or more of the properties described above.

In still another aspect embodiments of the invention provide an aqueous dispersion comprising (A) at least one thermoplastic resin; (B) at least one dispersing agent; and (C) water; wherein the thermoplastic resin comprises a propylene-rich alpha-olefin interpolymer comprising 5 to 25% by weight of ethylene-derived units and 95 to 75% by weight of propylene-derived units, the copolymer having: (a) a melting point of less than 90° C.; (b) a relationship of elasticity to 500% tensile modulus such that the elasticity is less than or equal to 0.935M+12, where elasticity is in percent and M is the 500% tensile modulus in MPa; and (c) a relationship of flexural modulus to 500% tensile modulus such that flexural modulus is less than or equal to $4.2e^{0.27M}+50$, where flexural modulus is in MPa and M is the 500% tensile modulus in MPa.

In another aspect of the invention, the some dispersion are suitable for making various articles. Some such articles include coatings, foams and froths as well as decorative articles.

BRIEF DESCRIPTION OF THE DRAWINGS

FIG. 1 is a schematic representation of a typical melt-extrusion apparatus used to prepare embodiments of the invention.

DETAILED DESCRIPTION OF EMBODIMENTS OF THE INVENTION

In the following description, all numbers disclosed herein are approximate values, regardless whether the word "about"

or "approximate" is used in connection therewith. They may vary by 1%, 2%, 5%, and sometimes, 10 to 20%. Whenever a numerical range with a lower limit, $R_L$ and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1% to 100% with a 1% increment, i.e., k is 1%, 2%, 3%, 4%, 5%, ..., 50%, 51%, 52%, ..., 95%, 96%, 97%, 98%, 99%, or 100%. Moreover, any numerical range defined by two R numbers as defined in the above is also specifically disclosed.

The thermoplastic resin (A) included in embodiments of the aqueous dispersion of the present invention is a resin that is not readily dispersible in water by itself. In some embodiments it is present in the dispersion in an amount of from greater than 0 percent by wt. to less than about 96 percent by wt. In certain embodiments, the resin is present in an amount of from about 35 to about 65 percent by wt. of the dispersion. The term "resin" used herein should be construed to include synthetic polymers or chemically modified natural resins such as but not limited to thermoplastic materials such as polyvinyl chloride, polystyrene, and polyethylene and thermosetting materials such as polyesters, epoxies, and silicones that are used with fillers, stabilizers, pigments, and other components to form plastics. The term resin as used herein includes elastomers and is understood to include blends of olefin polymers. In some embodiments, the thermoplastic resin is a semicrystalline resin. The term "semi-crystalline" is intended to identify those resins that possess at least one endotherm when subjected to standard differential scanning calorimetry (DSC) evaluation. Some semi-crystalline polymers exhibit a DSC endotherm that exhibits a relatively gentle slope as the scanning temperature is increased past the final endotherm maximum. This reflects a polymer of broad melting range rather than a polymer having what is generally considered to be a sharp melting point. Some polymers useful in the dispersions of the invention have a single melting point while other polymers have more than one melting point. In some polymers one or more of the melting points may be sharp such that all or a portion of the polymer melts over a fairly narrow temperature range, such as a few degrees centigrade. In other embodiments, the polymer may exhibit broad melting characteristics over a range of about 20° C.

Examples of the thermoplastic resin (A) which may be used in the present invention include homopolymers and copolymers (including elastomers) of an alpha-olefin such as ethylene, propylene, 1-butene, 3-methyl-1-butene, 4-methyl-1-pentene, 3-methyl-1-pentene, 1-heptene, 1-hexene, 1-octene, 1-decene, and 1-dodecene as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene as typically represented by ethylene-butadiene copolymer and ethylene-ethylidene norbornene copolymer; and polyolefins (including elastomers) such as copolymers of two or more alpha-olefins with a conjugated or non-conjugated diene as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer; styrenic copolymers (including elastomers) such as polystyrene, ABS, acrylonitrile-styrene copolymer, α-methylstyrene-styrene copolymer; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6,6, and nylon 12; thermoplastic polyesters such as polyethylene terephthalate and polybutylene terephthalate; polycarbonate, polyphenylene oxide, and the like. These resins may be used either alone or in combinations of two or more.

In one embodiment, thermoplastic polymer is a polyester, as described in the U.S. Pat. No. 7,521,166, incorporated herein by reference. Such polyesters comprise crystalline polyesters having an index of crystallinity of from 0.6 to 1.5. The crystalline polyesters has an index of crystallinity of preferably from 0.8 to 1.3, more preferably from 0.9 to 1.1, and even more preferably from 0.98 to 1.05. The crystalline polyester may have acidic groups at the terminal of the molecule. The acidic group includes a carboxyl group, a sulfonate group, a phosphonate group, a sulfinate group and the like. The amount of the acidic groups at the terminal of the molecule of the crystalline polyester is one of the important factors for determining the stability of the emulsion particles and the particle size distribution and particle size of the toner. In order to stabilize the emulsion particles and obtain a toner having a small particle size with a sharp particle size distribution, the amount of the acidic groups at the terminal of the molecule is preferably from 0.015 to 0.9 mmol, more preferably from 0.08 to 0.85 mmol, even more preferably from 0.15 to 0.8 mmol, and even more preferably from 0.25 to 0.75 mmol, per 1 g of the crystalline polyester. In addition, a carboxyl group can be introduced into the main chain of the polyester molecule by using a polycarboxylic acid such as trimellitic acid as a carboxylic acid component or a polyhydric alcohol such as pentaerythritol as an alcohol component as occasion demands. The amount of the acidic groups in the main chain of the polyester molecule is preferably 5% by mole or less, more preferably 3% by mole or less, and even more preferably 1% by mole or less, based on the number of moles of the entire carboxylic acid component constituting the polyester, from the viewpoint of inhibition of crystallization. In addition, the molar ratio as expressed by acidic groups in the main chain of the molecule to acidic groups at the terminal of the molecule in the crystalline polyester is preferably 30% by mole or less, more preferably 20% by mole or less, even more preferably 10% by mole or less, even more preferably 5% by mole or less, and even more preferably 2% by mole or less, from the same viewpoint. The amount of the acidic groups in the main chain of the crystalline polyester molecule and at the terminal of the molecule thereof can be calculated from the structures and the charging ratio of the raw material acid and the raw material alcohol for the crystalline polyester, the number-average molecular weight of the crystalline polyester, and the determination of the acid value. Also, the amount can be obtained by using an analytic means such as nuclear magnetic resonance spectroscopy (NMR) or X-ray photoelectron spectroscopy (XPS, ESCA, or the like) in combination with the determination of the acid value. The crystalline polyester may be contained in the resin binder in an amount of preferably 60% by weight or more, more preferably 70% by weight or more, and even more preferably 80% by weight or more. The crystalline polyester contained in the toner in an amount of preferably 60% by weight or more, more preferably 70% by weight or more, and even more preferably from 80 to 95% by weight. The amorphous polyester has a softening point of preferably from 95° C. to 160° C., a glass transition temperature of preferably from 50° C. to 75° C., an acid value of preferably from 1 to 40 mg KOH/g, and a hydroxyl value of preferably from 3 to 60 mg KOH/g. The crystalline polyester has a melting point of preferably from 60° C. to 150° C., more preferably from 60° C. to 130° C., and even more preferably from 60° C. to 120° C., from the viewpoint of low-temperature fixing ability. The amorphous polyester has a number-average molecular weight of preferably from 1000 to 100000, more preferably from 1000 to 50000, and even more preferably from 1000 to 12000, from the viewpoint of durability and fixing ability. The crystalline polyester has a number-average molecular weight of preferably from 2000 to 100000, more preferably from 2000 to 20000, even more preferably from 2000 to 10000, and even more preferably from 2000 to 8000, from the viewpoint of emulsifiability, fixing ability and offset resistance.

In one embodiment, thermoplastic polymer is a polyester, as described in the US Publication No. 2009/0092918, incorporated herein by reference. Such polyesters comprise crystalline polyesters. Illustrative examples of crystalline polyesters include any of various polyesters, such as poly(ethylene-adipate), poly(propylene-adipate), poly(butylene-adipate), poly(pentylene-adipate), poly(hexylene-adipate), poly(octylene-adipate), poly(nonylene-adipate), poly(decylene-adipate), poly(undecylene-adipate), poly(ododecylene-adipate), poly(ethylene-glutarate), poly(propylene-glutarate), poly(butylene-glutarate), poly(pentylene-glutarate), poly(hexylene-glutarate), poly(octylene-glutarate), poly(nonyleno-glutarate), poly(decylene-glutarate), poly(undecylene-glutarate), poly(ododecylene-glutarate), poly(ethylene-succinate), poly(propylene-succinate), poly(butylene-succinate), poly(pentylene-succinate), poly(hexylene-succinate), poly(octylene-succinate), poly(nonylene-succinate), poly(decylene-succinate), poly(undecylene-succinate), poly(ododecylene-succinate), poly(ethylene-pimelate), poly(propylene-pimelate), poly(butylene-pimelate), poly(pentylene-pimelate), poly(hexylene-pimelate), poly(octylene-pimelate), poly(nonylene-pimelate), poly(decylene-pimelate), poly(undecylene-pimelate), poly(ododecylene-pimelate), poly(ethylene-sebacate), poly(propylene-sebacate), poly(butylene-sebacate), poly(pentylene-sebacate), poly(hexylene-sebacate), poly(octylene-sebacate), poly(nonylene-sebacate), poly(decylene-sebacate), poly(undecylene-sebacate), poly(ododecylene-sebacate), poly(ethylene-azelate), poly(propylene-azelate), poly(butylene-azelate), poly(pentylene-azelate), poly(hexylene-azelate), poly(octylene-azelate), poly(nonylene-azelate), poly(decylene-azelate), poly(undecylene-azelate), poly(ododecylene-azelate), poly(ethylene-dodecanoate), poly(propylene-dodecanoate), poly(butylene-dodecanoate), poly(pentylene-dodecanoate), poly(hexylene-dodecanoate), poly(octylene-dodecanoate), poly(nonylene-dodecanoate), poly(decylene-dodecanoate), poly(undecylene-dodecanoate), poly(ododecylene-dodecanoate), poly(ethylene-fumarate), poly(propylene-fumarate), poly(butylene-fumarate), poly(pentylene-fumarate), poly(hexylene-fumarate), poly(octylene-fumarate), poly(nonylene-fumarate), poly(decylene-fumarate), poly(undecylene-fumarate), poly(ododecylene fumarate), copoly-(butylene-fumarate)-copoly-(hexylene-fumarate), copoly-(ethylene-dodecanoate)-copoly-(ethylene-fumarate), mixtures thereof, and the like. Illustrative examples of amorphous polyesters include, for example poly(1,2-propylene-diethylene)terephthalate, polyethyleneterephthalate, polypropylene-terephthalate, polybutylene-terephthalate, polypentylene-terephthalate, polyhexylene-terephthalate, polyheptadene-terephthalate, polyoctalene-terephthalate, polyethylene-sebacate, polypropylene-sebacate, polybutylene-sebacate, polyethylene-adipate, polypropylene-adipate, polybutylene-adipate, polypentylene-adipate, polyhexylene-adipate polyheptadene-adipate, polyoctalene-adipate, polyethylene-glutarate, polypropylene-glutarate, polybutylene-glutarate, polypentylene-glutarate, polyhexylene-glutarate, polyheptadene-glutarate, polyoctalene-glutarate, polyethylene-pimelate, polypropylene-pimelate, polybutylene-pimelate, polypentylene-pimelate, polyhexylene-pimelate, polyheptadene-pimelate, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), or poly(1,2-propylene itaconate). The amorphous polyester resin may also be crosslinked or branched to, for example, assist in the achievement of a broad fusing latitude, or when black or matte prints are desired. Mixtures of two or more of the above polymers may also be used, if desired.

In one embodiment, thermoplastic polymer is a polyester, as described in the US Publication No. 2009/006139, incorporated herein by reference. Such polyesters comprise crystalline polyesters a crystalline resin. The crystalline resin is, for example, an alkali sulfonated polyester resin. Examples of polyester based crystalline resins include, but are not limited to alkali copoly(5-sulfoisophthaloyl)-co-poly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), and alkali copoly(5-sulfo-iosphthaloyl)-copoly(octylene-adipate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-co-poly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl-copoly(butylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-iosphthaloyl)-copoly(butylene-adipate), alkali copoly(5-sulfo-isophthaloyl)-copoly(pentylene-adipate), alkali copoly(5-sulfo-isophthaloyl)copoly(hexylene-adipate), poly(octylene-adipate), and wherein alkali is a metal like sodium, lithium or potassium. In embodiments, the alkali metal is lithium. The crystalline resin is, in embodiments, present in an amount of from about 5 to about 30 percent by weight of the toner components, and, in other embodiments, from about 15 to about 25 percent by weight of the toner components. The crystalline resin can possess various melting points of, for example, from about 30° C. to about 120° C., and may be, in embodiments, from about 50° C. to about 90° C. The crystalline resin may have, for example, a number average molecular weight ($M_n$), as measured by gel permeation chromatography (GPC) of, for example, from about 1,000 to about 50,000, and may be from about 2,000 to about 25,000. The weight average molecular weight ($M_w$) of the resin may be, for example, from about 2,000 to about 100,000, and preferably from about 3,000 to about 80,000, as determined by gel permeation chromatography using polystyrene standards. The molecular weight distribution ($M_w/M_n$) of the crystalline resin is, for example, from about 2 to about 6, and more specifically, from about 2 to about 4.

In one embodiment, thermoplastic polymer is a polyester, as described in the US Publication No. 209/0061349, incorporated herein by reference. Such polyesters comprise crystalline polyesters include a branched amorphous resin. In embodiments, the branched amorphous resin is an alkali sulfonated polyester resin. Examples of suitable alkali sulfonated polyester resins include, but are not limited to, the metal or alkali salts of copoly(ethylene-terephthalate)-copoly-(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfo-isophthalate), copoly(propylene-butylene-terephthalate)-copoly propylene-butylene-5-sulfo-isophthalate), copoly(propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly (ethoxylated bisphenol-A-5-sulfo-isophthalate), and wherein the alkali metal is, for example, a sodium, lithium or potassium ion. The branched amorphous polyester resin, in embodiments, possess, for example, a number average molecular weight ($M_n$), as measured by gel permeation chromatography (GPC), of from about 10,000 to about 500,000, and may be from about 5,000 to about 250,000; a weight average molecular weight ($M_w$) of, for example, from about 20,000 to about 600,000, and may be from about 7,000 to about 300,000, as determined by gel permeation chromatography using polystyrene standards; and wherein the molecular weight distribution ($M_w/M_n$) is, for example, from about 1.5 to about 6, and more specifically, from about 2 to about 4. The onset glass transition temperature ($T_g$) of the resin as measured by a differential scanning calorimeter (DSC) is, in embodiments, for example, from about 55° C. to about 70° C., and more specifically, from about 55° C. to about 67° C.

Examples of suitable polyester resin binders, as described in U.S. Pat. No. 7,498,112, is incorporated herein by reference, include polyethylene-terephthalate, polypropylene-terephthalate, polybutylene-terephthalate, polypentylene-terephthalate, polyhexylene-terephthalate, polyheptadene-terephthalate, polyoctalene-terephthalate, polyethylene-sebacate, polypropylene sebacate, polybutylene-sebacate, polyethylene-adipate, polypropylene-adipate, polybutylene-adipate, polypentylene-adipate, polyhexylene-adipate, polyheptadene-adipate, polyoctalene-adipate, polyethylene-glutarate, polypropylene-glutarate, polybutylene-glutarate, polypentylene-glutarate, polyhexylene-glutarate, polyheptadene-glutarate, polyoctalene-glutarate polyethylene-pimelate, polypropylene-pimelate, polybutylene-pimelate, polypentylene-pimelate, polyhexylene-pimelate, polyheptadene-pimelate, poly(propoxylated bisphenol-fumarate), poly (propoxylated bisphenol-succinate), poly(propoxylated bisphenol-adipate) and poly(propoxylated bisphenol-glutarate).

In one embodiment, the thermoplastic polymer is a polyester, as described in the U.S. Pat. Nos. 5,593,807, 5,290,654, 5,308,734, and 5,370,963.

In one embodiment, the thermoplastic polymer is a polyester, sodio-sulfonated polyester resin as disclosed in a number of patents, such as U.S. Pat. Nos. 6,387,581 and 6,395,445.

Other polyesters such as those derived from a (meth) acrylic acid-modified rosin and a resin derived from a fumaric acid/maleic acid-modified rosin, as described in EP Pat. No. 2028551, are also included.

In one embodiment, the thermoplastic polymer is an amorphous resin, as described in U.S. Pat. No. 7,494,757, such amorphous resins include polyester resins, branched polyester resins, polyimide resins, branched polyimide resins, poly (styrene-acrylate) resins, crosslinked, for example from about 25 percent to about 70 percent, poly(styrene-acrylate) resins, poly(styrene-methacrylate) resins, crosslinked poly (styrene-methacrylate) resins, poly(styrene-butadiene) resins, crosslinked poly(styrene-butadiene) resins, alkali sulfonated-polyester resins, branched alkali sulfonated-polyester resins, alkali sulfonated-polyimide resins, branched alkali sulfonated-polyimide resins, alkali sulfonated poly(styrene-acrylate) resins, crosslinked alkali sulfonated poly(styrene-acrylate) resins, poly(styrene-methacrylate) resins, crosslinked alkali sulfonated-poly(styrene-methacrylate) resins, alkali sulfonated-poly(styrene-butadiene) resins, and crosslinked alkali sulfonated poly (styrene-butadiene) resins. The amorphous resin is preferably a branched amorphous sulfonated polyester resin or a linear amorphous sulfonated polyester resin. Branched amorphous sulfonated polyester resins are preferred, for example, when the fuser does not contain a fuser oil or when black or matte prints are desired. Liner amorphous sulfonated polyester resins are preferred, for example, when the fuser include an oil. Branched amorphous resins can be a polyester, a polyamide, a polyimide, a polystyrene-acrylate, a polystyrene-methacrylate, a polystyrene-butadiene, or a polyester-imide, an alkali sulfonated polyester, an alkali sulfonated polyamide, an alkali sulfonated polyimide, an alkali sulfonated polystyrene-acrylate, an alkali sulfonated polystyrene-methacrylate, an alkali sulfonated polystyrene-butadiene, or an alkali sulfonated polyester-imide, a sulfonated polyester resin, copoly (ethylene-terephthalate)-copoly(ethylene-5-sulfo-isophthalate), copoly(propylene-terephthalate)-copoly(propylene-5-sulfo-isophthalate), copoly(diethylene-terephthalate)-copoly (diethylene-5-sulfo-isophthalate), copoly(propylene-diethylene-terephthalate)-copoly(propylene-diethylene-5-sulfoisophthalate), copoly(propylene-butylene-terephthalate)-copoly(propylene-butylene-5-sulf-o-isophthalate), copoly(propoxylated bisphenol-A-fumarate)-copoly (propoxylated bisphenol A-5-sulfo-isophthalate), copoly(ethoxylated bisphenol-A-fumarate)-copoly(ethoxylated bisphenol-A-5-sulfo-isophthalate), or copoly(ethoxylated bisphenol-A-maleate)copoly(ethoxylated bisphenol-A-5-sulfo-isophthalate). The amorphous resin is, for example, present in an amount from about 50 to about 90 percent by weight, and more preferably from about 65 to about 85 percent by weight of the binder. Preferably the amorphous resin is a branched amorphous sulfonated polyester resin. The amorphous resin in preferred embodiments possesses, for example, a number average molecular weight (Mn), as measured by gel permeation chromatography (GPC), of from about 10,000 to about 500,000, and preferably from about 5,000 to about 250,000; a weight average molecular weight (Mw) of, for example, from about 20,000 to about 600,000, and preferably from about 7,000 to about 300,000, as determined by GPC using polystyrene standards; and wherein the molecular weight distribution (Mw/M) is, for example, from about 1.5 to about 6, and more specifically, from about 2 to about 4. Sulfonated polyester resins are most preferred as the crystalline resin herein. The crystalline resin is sulfonated from about 0.5 weight percent to about 4.5 weight percent, and preferably from about 1.5 weight percent to about 4.0 weight percent. The crystalline resin is, for example, present in an amount of from about 10 to about 50 percent by weight of the binder, and preferably from about 15 to about 40 percent by weight of the binder. The crystalline resin can possess melting points of, for example, from at least about 70° C., and preferably from about 70° C. to about 80° C., and a number average molecular weight (Mn), as measured by gel permeation chromatography (GPC) of, for example, from about 1,000 to about 50,000, and preferably from about 2,000 to about 25,000; with a weight average molecular weight (Mw) of the resin of, for example, from about 2,000 to about 100,000, and preferably from about 3,000 to about 80,000, as determined by GPC using polystyrene standards. The molecular weight distribution (Mw/Mn) of the crystalline resin is, for example, from about 2 to about 6, and more specifically, from about 2 to about 4.

In one embodiment, thermoplastic polymer is an amorphous polyester resin, as described in the US Publication No. 2009/0047593, incorporated herein by reference. Illustrative examples of amorphous polymer resins include any of the various amorphous polyesters, such as polyethylene-terephthalate, polypropylene-terephthalate, polybutylene-terephthalate, polypentylene-terephthalate, polyhexylene-terephthalate, polyheptadene-terephthalate, polyoctalene-terephthalate, polyethylene-sebacate, polypropylene sebacate, polybutylene-sebacate, polyethylene-adipate, polypropylene-adipate, polybutylene-adipate, polypentylene-adipate, polyhexylene-adipate, polyheptadene-adipate, polyoctalene-adipate, polyethylene-glutarate, polypropylene-glutarate, polybutylene-glutarate, polypentylene-glutarate, polyhexylene-glutarate, polyheptadene-glutarate, polyoctalene-glutarate polyethylene-pimelate, polypropylene-pimelate, polybutylene-pimelate, polypentylene-pimelate, polyhexylene-pimelate, polyheptadene-pimelate, poly(propoxylated bisphenol-fumarate), poly(propoxylated bisphenol-succinate), poly(propoxylated bisphenol-adipate), poly(propoxylated bisphenol-glutarate), SPAR™ (Dixie Chemicals), BECKOS OL™ (Reichhold Inc), ARAKOTE™ (Ciba-Geigy Corporation), HETRON™ (Ashland Chemical), PARAPLEX™ (The Dow Chemical Company), POLYLITE™ (Reichhold Inc), PLASTHALL™ (The Dow Chemical Company), CYGAL™ (American Cyanamide), ARMCO™ (Armco Composites), ARPOL™ (Ashland Chemical), CELANEX™ (Celanese Eng), RYNITE™ (DuPont), STYPOL™ (Freeman Chemical Corporation), mixtures thereof and the like. The resins may also be functionalized, such as being carboxylated, sulfonated, or the like, such as sodio sulfonated. The amorphous resins may be linear or branched, and are available from a number of sources. The amorphous resin may possess various onset glass transition temperatures (Tg) of from about 40° C. to about 80° C., such as from about 50° C. to about 70° C., as measured by differential scanning calorimetry (DSC). The linear and branched amorphous polyester resins, in embodiments, may possess a number average molecular weight (Mn), as measured by gel permeation chromatography (GPC), of from about 10,000 to about 500,000, such as from about 5,000 to about 250,000; a weight average molecular weight (Mw) of from about 20,000 to about 600,000, such as from about 7,000 to about 300,000, as determined by GPC using polystyrene standards; and a molecular weight distribution (Mw/Mn) of from about 1.5 to about 6, such as from about 2 to about 4.

In one embodiment, thermoplastic polymer is a crystalline polyester resin, as described in the US Publication No. 2009/0047593, incorporated herein by reference. Illustrative examples of crystalline polymer resins include poly(ethylene-adipate), poly(propylene-adipate), poly(butylene-adipate), poly(pentylene-adipate), poly(hexylene-adipate), poly(octylene-adipate), poly(nonylene-adipate), poly(decylene-adipate), poly(undecylene-adipate), poly(ododecylene-adipate), poly(ethylene-glutarate), poly(propylene-glutarate), poly(butylene-glutarate), poly(pentylene-glutarate), poly(hexylene-glutarate), poly(octylene-glutarate), poly(nonylene-glutarate), poly(decylene-glutarate), poly(undecylene-glutarate), poly(ododecylene-glutarate), poly(ethylene-succinate), poly(propylene-succinate), poly(butylene-succinate), poly(pentylene-succinate), poly(hexylene-succinate), poly(octylene-succinate), poly(nonylene-succinate), poly(decylene-succinate), poly(undecylene-succinate), poly(ododecylene-succinate), poly(ethylene-pimelate), poly(propylene-pimelate), poly(butylene-pimelate), poly(pentylene-pimelate), poly(hexylene-pimelate), poly(octylene-pimelate), poly(nonylene-pimelate), poly(decylene-pimelate), poly(undecylene-pimelate), poly(ododecylene-pimelate), poly(ethylene-sebacate), poly(propylene-sebacate), poly(butylene-sebacate), poly(pentylene-sebacate), poly(hexylene-sebacate), poly(octylene-sebacate), poly(nonylene-sebacate), poly(decylene-sebacate), poly(undecylene-sebacate), poly(ododecylene-sebacate), poly(ethylene-azelate), poly(propylene-azelate), poly(butylene-azelate), poly(pentylene-azelate), poly(hexylene-azelate), poly(octylene-azelate), poly(nonylene-azelate), poly(decylene-azelate), poly(undecylene-azelate), poly(ododecylene-azelate), poly(ethylene-dodecanoate), poly(propylene-dodecanoate), poly(butylene-dodecanoate), poly(pentylene-dodecanoate), poly(hexylene-dodecanoate), poly(octylene-dodecanoate), poly(nonylene-dodecanoate), poly(decylene-dodecanoate), poly(undecylene-dodecanoate), poly(ododecylene-dodecanoate), poly(ethylene-fumarate), poly(propylene-fumarate), poly(butylene-fumarate), poly(pentylene-fumarate), poly(hexylene-fumarate), poly(octylene-fumarate), poly(nonylene-fumarate), poly(decylene-fumarate), poly(undecylene-fumarate), poly(ododecylene-fumarate), copoly-(butylene-fumarate)-copoly-(hexylene-fumarate), copoly-(ethylene-dodecanoate)-copoly-(ethylene-fumarate), mixtures thereof, and the like. The crystalline resin may be derived from monomers selected from, for example, organic diols and diacids in the presence of a polycondensation catalyst. The crystalline resin may be present in an amount of from about 3 to about 20 percent by weight of the core, such as from about 5 to about 15 percent by weight or from about 5 to about 10 percent by weight of the core. The shell is substantially free of crystalline polyester. The crystalline resin can possess a melting point of, for example, from at least about 60° C., such as from about 70° C. to about 80° C., and a number average molecular weight (Mn), as measured by gel permeation chromatography (GPC) of from about 1,000 to about 50,000, or from about 2,000 to about 25,000, with a weight average molecular weight (Mw) as determined by GPC using polystyrene standards of from about 2,000 to about 100,000, or from about 3,000 to about 80,000. The molecular weight distribution (Mw/Mn) of the crystalline resin is from about 2 to about 6, such as from about 2 to about 4.

In one embodiment, thermoplastic polymer is a polymer binder, as described in the US Publication No. 2009/0047591, incorporated herein by reference. Such polymer binders may include polyester based polymer binder. Illustrative examples of suitable polyester-based polymer binders may include any of the various polyesters, such as polyethylene-terephthalate, polypropylene-terephthalate, polybutylene-terephthalate, polypentylene-terephthalate, polyhexylene-terephthalate, polyheptadene-terephthalate, polyoctalene-terephthalate, polyethylene-sebacate, polypropylene sebacate, polybutylene-sebacate, polyethylene-adipate, polypropylene-adipate, polybutylene-adipate, polypentylene-adipate, polyhexalene-adipate, polyheptadene-adipate, polyoctalene-adipate, polyethylene-glutarate, polypropylene-glutarate, polybutylene-glutarate, polypentylene-glutarate, polyhexylene-glutarate, polyheptadene-glutarate, polyoctalene-glutarate polyethylene-pimelate, polypropylene-pimelate, polybutylene-pimelate, polypentylene-pimelate, polyhexylene-pimelate, polyheptadene-pimelate, polypropoxylated bisphenol-fumarate), poly(propoxylated bisphenol-succinate), poly propoxylated bisphenol-adipate), poly(propoxylated bisphenol-glutarate), SPAR™ (Dixie Chemicals), BECKOSOL™ (Reichhold Chemical Inc), AIAOTE™ (Ciba-Geigy Corporation), HETRON™ (Ashland Chemical), PARALEX™ (The Dow Chemical Company), POLYLITE™ (Reichhold Chemical Inc), PLASTHALL™ (The Dow Chemical Company), CYGAL™ (American Cyanamide), ARMCO™ (Armco Composites), ARPOL™ (Ashland Chemical), CELANEX™ (Celanese Eng), RYNITE™ (DuPont), STYPOL™ (Freeman Chemical Corporation) mixtures thereof and the like.

In one embodiment, thermoplastic polymer is a polyester, as described in the US Publication No. 200900791, incorporated herein by reference. Such polyesters comprise polyester based polymers may include alkali copoly(5-sulfoisophthaloyl)-co-poly(ethylene-adipate), alkali copoly(5-sulfoisophthaloyl)-copoly(propylene-adipate), alkali copoly(5-sulfoisophthal(oyl)-copoly(butylene-adipate), alkali copoly(5-sulfo-isophthaloyl)-copolyfpentylene-adipate), and alkali copoly(5-sulfo-iosphthalovl)-ovoly(octylene-adipate), alkali copoly(5-sulfo-isophthaloyl)-copoly(ethylene-adipate), alkali copoly(5-sulfo-isophthaloyl)-copoly(propylene-adipate), alkali copoly(5-stilfo-isophtthaloyl)-co-poly(butylene-adipate), alkali copoly(5-sulfo-isophthaloyl)-copoly(pentylene-adipate), alkali copoly(5-sulfo-isophthaioyl)-copoly(hexylene-adipate), alkali copoly(5-sulfo-isophthaloyl)-copoly(octylene-adipate), alkali copoly(5-sulfoisophthaloyl)-copoly(ethylene-sticcinate), alkali copoly (5-sultoisophthaloyl-copolyfbutylene-succinate), alkali copoly 5-sulfoisophthaloyl)-copoly hexylene-suceinate), alkali copoly(5-sulfooisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthalyol)-copoly(butylene-sebacate), alkali copoly(5-sulfo-isophthaloyl)-copolypentylene-sebacate), alkali copoly(5-sulfo-isophthaloyl)-copoly(hexylene-sebacate). alkali copoly(5-sulfo-isophthaloyl)-copoly(octylene-sebacate), alkali copoly(5-sulfo-isophlthaloyl)-copoly(ethylene-adipate), alkali copoly(5-sulfo-isophthaloyl)-copolytpropylene-adipate), alkali copoiy(5-sulfo-iosphthaloyl)-copoly(butylene-adipate), alkali copoly(5-sulfo-isophthaloyl)-copolyfpentylene-adipate), alkali copoly(5-sulfo-isophthaloyl)copoly(hexylene-adipate), poly(octylene-adipate). Mixtures of two or more of the above polymers may also be used, if desired.

In one embodiment, thermoplastic polymer is a polymer binder, as described in the EP Pat. No. 2026134, incorporated herein by reference. Such polymer binders may include a polyester based polymer binder. Illustrative examples of suitable polyester-based polymer binders may include any of the various polyesters, such as polyethylene-terephthalate, polypropylene terephthalate, polybutylene-terephthalate, polypentylene-terephthalate, polyhexylene terephthalate, polyheptadene-terephthalate, polyoctalene-terephthalate, polyethylene sebacate, polypropylene sebacate, polybutylenesebacate, polyethylene-adipate, polypropylene-adipate, polybutylene-adipate, polypentylene-adipate, polyhexylene adipate, polyheptadene-adipate, polyoctalene-adipate, polyethylene-glutarate, polypropylene-glutarate, polybutylene-glutarate, polypentylene-glutarate, polyhexylene glutarate, polyheptadene-glutarate, polyoctalene-glutarate polyethylene-pimelate, polypropylene-pimelate, polybutylene-pimelate, polypentylene-pimelate, polyhexylene pimelate, polyheptadene-pimelate, poly(propoxylated bisphenol-fumarate), poly(propoxylated bisphenol-succinate), poly (propoxylated bisphenol-adipate), poly(propoxylated bisphenol-glutarate), SPAR™ (Dixie Chemicals), BECKOSOL™ (Reichhold Chemical Inc), ARAKOTE™ (Ciba-Geigy Corporation), HETRON™ (Ashland Chemical), PARAPLEX™ (The Dow Chemical Company), POLYLITE™ (Reichhold Chemical Inc), PLASTHALL™ (The Dow Chemical Company), CYGAL™ (American Cyanamide), ARMCO™ (Armco Composites), ARPOL™ (Ashland Chemical), CELANEX™ (Celanese Eng), RYNITE™ (DuPont), STYPOL™ (Freeman Chemical Corporation), sulfonated polyesters, mixtures thereof and the like. Examples of polyester based polymers may include alkali copoly(5sulfoisophthaloyl)-co-poly(ethylene-adipate), alkali copoly(5-sulfoisophthaloyl) copoly(propylene-adipate), alkali copoly(5-sulfoisophthaloyl)-copoly(butyleneadipate), alkali copoly(5-sulfo-isophthaloyl)-copoly(pentylene-adipate), and alkali copoly(5-sulfo iosphthaloyl)-copoly(octylene-adipate), alkalicopoly(5-sulfo-isophthaloyl)copoly(ethylene-adipate), alkalicopoly(5-sulfo-isophthaloyl)-copoly(propylene-adipate), alkali copoly(5-sulfo-isophthaloyl)-co-poly(butylene-adipate), alkali copoly(5-sulfo isophthaloyl)-copoly(pentylene-adipate), alkali copoly(5-sulfo-isophthaloyl)copoly(hexylene-adipate), alkali copoly(5-sulfoisophthaloyl)-copoly(octylene-adipate), alkali copoly(5-sulfoisophthaloyl)-copoly (ethylene-succinate), alkali copoly(5-sulfoisophthaloyl-copoly(butylene-succinate), alkali copoly(5-sulfoisophthaloyl)copoly(hexylene-succinate), alkali copoly (5-sulfoisophthaloyl)-copoly(octylene succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo isophthaloyl)-copoly(butylene-sebacate), alkali copoly(5-sulfo-isophthaloyl)copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5 sulfo-isophthaloyl)-copoly(ethylene-adipate), alkali copoly(5-sulfo-isophthaloyl)copoly(propylene-adipate), alkali copoly (5-sulfo-iosphthaloyl)-copoly(butylene-adipate), alkali copoly(5-sulfo-isophthaloyl)-copoly(pentylene-adipate), alkali copoly(5-sulfoisophthaloyl)copoly(hexylene-adipate), poly(octylene-adipate). Mixtures of two or more of the above polymers may also be used, if desired.

In one embodiment, thermoplastic polymer is a polyester, as described in the WO Publication No. 2009/02155, incorporated herein by reference. Such polyesters comprise a polyester containing structural units derived from a carboxylic acid having a valence of 3 or higher.

In one embodiment, the binder resin may be a polyester resin, as described in the US Publication No. 2009/0017393, incorporated herein by reference. Examples of suitable polyester resins include polyethylene-terephthalate, polypropylene-terephthalate, polybutylene-terephthalate, polypentylene-terephthalate, polyhexylene-terephthalate, polyheptadene-terephthalate, polyoctalene-terephthalate, polyethylene-sebacate, polypropylene sebacate, polybutylene-sebacate, polyethylene-adipate, polypropylene-adipate, polybutylene-adipate, polypentylene-adipate, polyhexylene-adipate, polylheptadene-adipate, polyoctalene-adipate, polyethylene-glutarate, polypropylene-glutarate, polybutylene-glutarate, polypentylene-glutarate, polyhexylene-glutarate, polyheptadene-glutarate, polyoctalene-glutarate polyethylene-pimelate, polypropylene-pimelate, polybutylene-pimelate, polypentylene-pimelate, polyhexylene-pimelate, polyheptadene-pimelate, poly(propoxylated bisphenol-fumarate), poly(propoxylated bisphenol-succinate), poly(propoxylated bisphenol-adipate), poly(propoxylated bisphenol-glutarate) and mixtures thereof.

In one embodiment, thermoplastic polymer is a polyester, as described in the EP Patent No. 2015142, incorporated herein by reference. Such polyesters resins may be selected from the group consisting of polyethylene terephthalate, polypropylene-terephthalate, polybutylene -terephthalate, polypentylene-terephthalate, polyhexylene-terephthalate, polyheptadene-terephthalate, polyoctalene-terephthalate, polyethylene-sebacate, polypropylene sebacate, polybutylene-sebacate, polyethylene-adipate, polypropylene-adipate, polybutylene adipate, polypentylene-adipate, polyhexylene-adipate, polyheptadene-adipate, polyoctalene-adipate, polyethylene-glutarate, polypropylene-glutarate, polybutylene-glutarate, polypentylene-glutarate, polyhexylene-glutarate, polyheptadene-glutarate, polyoctalene-glutarate polyethylene-pimelate, polypropylene-pimelate, polybutylene-pimelate, polypentylene-pimelate, polyhexylene-pimelate, polyheptadene-pimelate, poly(propoxylated bisphenol-fumarate), poly(propoxylated bisphenol-succinate), poly(propoxylated bisphenol-adipate), poly(propoxylated bisphenol-glutarate) and mixtures thereof. a polyester resin, such as a sodio-sulfonated polyester resin. Examples of suitable polyester resins include polyethylene-terephthalate, polypropylene-terephthalate, polybutylene-terephthalate, polypentylene-terephthalate, polyhexylene-terephthalate, polyheptadene-terephthalate, polyoctalene-terephthalate, polyethylene-sebacate, polypropylene sebacate, polybutylene-sebacate, polyethylene-adipate, polypropylene-adipate, polybutylene-adipate, polypentylene-adipate, polyhexylene-adipate, polyheptadene-adipate, polyoctalene-adipate, polyethylene-glutarate, polypropylene-glutarate, polybutylene glutarate, polypentylene-glutarate, polyhexylene-glutarate, polyheptadene-glutarate, polyoctalene-glutarate polyethylene-pimelate, polypropylenepimelate, polybutylene-pimelate, polypentylene-pimelate, polyhexylene-pimelate, polyheptadene-pimelate, poly(propoxylated bisphenol-fumarate), poly(propoxylated bisphenol-succinate), poly(propoxylated bisphenol-adipate), poly(propoxylated bisphenol-glutarate) and mixtures thereof.

In one embodiment, thermoplastic polymer is a polyester, as described in the EP Pat. No. 2012185, incorporated herein by reference. Such polyesters are obtainable by polycondensing an alcohol component and a carboxylic acid component wherein the carboxylic acid component contains a fumaric acid-modified rosin. The polyester has a softening point of preferably from 90° to 160° C., more preferably from 95° to 155° C., and even more preferably from 100° to 150° C., from the viewpoint of fixing ability, storage ability, and durability. The polyester has a glass transition temperature of preferably from 45° to 75° C., more preferably from 50° to 75° C., and even more preferably from 50° to 70° C., from the viewpoint of fixing ability, storage ability, and durability. The polyester has an acid value of preferably from 1 to 80 mg KOH/g, more preferably from 5 to 60 mg KOH/g, and even more preferably from 5 to 50 mg KOH/g, and a hydroxyl value of preferably from 1 to 80 mg KOH/g, more preferably from 8 to 50 mg KOH/g, and even more preferably from 8 to 40 mg KOH/g, from the viewpoint of triboelectric chargeability and environmental stability.

In one embodiment, thermoplastic polymer is a polyester, as described in the US Publication No. 2008/0318145, incorporated herein by reference. Such polyester tonor particles are created by the emulsion/aggregation (EA) process are illustrated in a number of patents, such as U.S. Pat. Nos. 5,593,807, 5,290,654. 5,308,734, and 5,370,963, each of which are incorporated herein by reference in their entirety.

In one embodiment, thermoplastic polymer is a polyester, as described in the EP Pat. No. 1482381, incorporated herein by reference. Such polyesters are obtained by polycondensation of raw material monomers including an alcohol component containing a dihydric or higher polyhydric alcohol and a carboxylic acid component containing a dicarboxylic or higher polycarboxylic acid compound. The polyester may be an amorphous polyester. The amorphous polyester may have a ratio of the softening point to the maximum peak temperature of heat of fusion (softening point/maximum peak temperature of heat of fusion) of more than 1.3 and 4.0 or less, preferably from 1.5 to 3. The amorphous polyester has a softening point of preferably from 80° to 160° C. from the viewpoints of storage property and fixing ability. The acid value of the polyester is preferably from 0.5 to 60 mg KOH/g, and the hydroxyl value is preferably from 1 to 60 mg KOH/g, from the viewpoints of dispersibility of the colorant and transferability. In the case of a positively chargeable toner, the acid value of the polyester is preferably 5 mg KOH/g or less, more preferably from 0.5 to 5 mg KOH/g, from the viewpoint of securing an even higher durability.

In one embodiment, thermoplastic polymer is a polyester, as described in the EP Pat. No. 1482382, incorporated herein by reference. Such polyesters may be any of amorphous polyesters or crystalline polyesters. The term "crystalline" means that the polyester has a ratio of the softening point to the maximum peak temperature of heat of fusion (softening point/maximum peak temperature of heat of fusion) of from 0.6 to 1.3, preferably from 0.9 to 1.2, more preferably greater than 1 and 1.2 or less. The term "amorphous" means that the polyester has a ratio of the softening point to the maximum peak temperature of heat of fusion (softening point/maximum peak temperature of heat of fusion) of greater than 1.3 and 4 or less, preferably from 1.5 to 3. The polyester is obtained by polycondensation of raw material monomers including an alcohol component containing dihydric or higher polyhydric alcohols with a carboxylic acid component containing dicarboxylic or higher polycarboxylic acid compounds. The polyester can be prepared by, for instance, polycondensation of the alcohol component and the carboxylic acid component under reduced pressure at a temperature of 180° to 250° C. in an inert gas atmosphere, in the presence of an esterification catalyst as desired. The amorphous polyester has a softening point of preferably from 80° to 165° C. and a glass transition temperature of preferably from 50° to 85° C. Also, the amorphous polyester has an acid value of preferably from 0.5 to 60 mg KOH/g, from the viewpoints of the dispersibility and the transferability of the colorant. Even more preferably, in the case of a positively chargeable toner, the acid value is preferably from 0.5 to 20 mg KOH/g, more preferably from 3 to 10 mg KOH/g. Also, in the case of a negatively chargeable toner, the acid value is preferably from 10 to 60 mg KOH/g. The hydroxyl value is preferably from 1 to 60 mg KOH/g, more preferably from 5 to 60 mg KOH/g, even more preferably from 10 to 50 mg KOH/g. Further, it is preferable that the polyester contains a high-softening point polyester and a low-softening point polyester. It is desired that the softening point of the high-softening point polyester is 120° C. or higher and 170° C. or lower, preferably from 130° to 170° C., more preferably from 135° to 155° C., and that the softening point of the low softening point polyester is from 80° C. or higher and less than 120° C., preferably from 90° to 115° C., more preferably from 95° to 110° C. The difference in softening point between the high-softening point polyester and the low-softening point polyester is preferably 10° C. or more, more preferably from 20° to 80° C., even more preferably from 30° to 60° C. It is preferable that both of the high-softening point polyester and the low softening point polyester are an amorphous polyester, and that the difference between the softening point and the glass transition temperature is preferably 20° C. or more, more preferably from 30° to 100° C. The weight ratio of the high-softening point polyester to the low-softening point polyester (high-softening point polyester/low-softening point polyester) is preferably from 5/95 to 95/5, more preferably from 20/80 to 90/10. Each of the high-softening point polyester and the low-softening point polyester may be a mixture of a plurality of polyesters. The hybrid resin may be obtained by using two or more resins as raw materials, or it may be obtained by using one resin and raw material monomers of the other resin. Further, the hybrid resin may be obtained from a mixture of raw material monomers of two or more resins. In order to efficiently obtain a hybrid resin, those obtained from a mixture of raw material monomers of two or more resins are preferable.

In one embodiment, thermoplastic polymer is a polyester, as described in the US Publication No. 2005/0271965, incorporated herein by reference. Such polyesters comprise a resin binder containing a crystalline polyester, and further contains at least a colorant. The amount of the crystalline polyester in the resin binder is preferably 50% by weight or more, more preferably 70% by weight or more, and even more preferably 80% by weight or more, from the viewpoint of low-temperature fixing ability. Other resin components besides the crystalline polyester include amorphous polyesters, polyester-polyamides, vinyl resins such as styrene-acrylic resins, hybrid resins in which a plural resin components are partially chemically bonded to each other. These resin components can be used in admixture of two or more kinds. From the viewpoint of compatibility of these resins with the crystalline polyester and fixing ability of the resulting toner, the hybrid resin having an amorphous polyester component and a vinyl resin component, and the amorphous polyester are preferable. Among them, the amorphous polyester is more preferable. The crystalline polyester may have acidic groups at the terminal of the molecule. The acidic group includes a carboxyl group, a sulfonate group, a phosphonate group, a sulfinate group and the like. The carboxyl group is preferable from the viewpoint of satisfying both the emulsifiability of the resin and environmental durability of the toner prepared therefrom. The crystalline polyester having acidic groups to be used in the present invention can be prepared by a usual polycondensation reaction. In other words, the crystalline polyester can be prepared by a dehydration polycondensation of acid components and alcohol components as raw materials, in the presence of a catalyst. In addition, a cross-linked structure can be introduced into the polyester by using a polycarboxylic acid such as trimellitic acid as an acid component or a polyhydric alcohol such as pentaerythritol as an alcohol component as occasion demands. In this case, the number of acidic groups at the terminal of the molecule can be 3 or more per molecule. The amount of the acidic groups in the main chain of the polyester molecule is preferably 5% mole or less, more preferably 3% mole or less, and even more preferably 1% mole or less, based on the number of moles of the entire acid component constituting the polyester, from the viewpoint of inhibition of crystallization. In addition, the molar ratio as expressed by (acidic groups in the main chain of the molecule)/(acidic groups at the terminal of the molecule) in the polyester is, for example, 30% mole or less, preferably 20% mole or less, more preferably 10% mole or less, even more preferably 5% mole or less, and even more preferably 2% mole or less, from the same viewpoint. Here, the acidic groups in the main chain of the molecule refer to acidic groups other than the acidic groups at the terminal of the molecule; for example, a sulfonate group in the case where a dicarboxylic acid into which a sulfonate group is introduced is used as an acid component. The amount of the acidic groups at the terminal of the molecule of the crystalline polyester to be used in the present invention is one of important factors for determining the stability of the emulsion particles and the particle size distribution and particle size of the toner. In order to stabilize the emulsion particles and obtain a toner having a small particle size with a sharp particle size distribution, the above-mentioned amount of the acidic groups at the terminal of the molecule is, for example, preferably from 0.015 to 0.9 mmol, more preferably from 0.08 to 0.85 mmol, even more preferably from 0.15 to 0.8 mmol, and even more preferably from 0.25 to 0.75 mmol, per 1 g of the crystalline polyester. The amount of the acidic groups in the main chain of the crystalline polyester molecule and at the terminal of the molecule thereof can be calculated from the structures and the charging ratio of the raw material acid and the raw material alcohol for the crystalline polyester, the number-average molecular weight of the crystalline polyester, and the determination of the acid value. Also, the amount can be obtained by using an analytic means such as nuclear magnetic resonance spectroscopy (NMR) or X-ray photoelectron spectroscopy (XPS, ESCA) in combination with the determination of the acid value. Here, the amount of the acidic groups in the present invention include neutralized acidic groups. The crystalline polyester has an acid value of, for example, preferably from 1 to 50 mg KOH/g, more preferably from 5 to 48 mg KOH/g, even more preferably from 10 to 45 mg KOH/g, and even more preferably from 15 to 40 mg KOH/g, per 1 g of the crystalline polyester, from the viewpoint of stabilizing the emulsion particles and obtaining a toner having a small particle size with a sharp particle size distribution. The crystalline polyester has a melting point of preferably from 60° to 150° C., more preferably from 60° to 130° C., and even more preferably from 60° to 120° C., from the viewpoint of low-temperature fixing ability. The crystalline polyester has a number-average molecular weight of, for example, preferably from 2000 to 100000, more preferably from 2000 to 20000, even more preferably from 2000 to 10000, and even more preferably from 2000 to 8000, from the viewpoint of emulsifiability, fixing ability and offset resistance. The extent of the crystallinity of the polyester is expressed by crystallinity index as defined by a ratio of the softening point to the temperature of the maximum endothermic peak determined by a differential scanning calorimeter, i.e. (softening point)/(temperature of the maximum endothermic peak). Generally, when the value for the crystallinity index exceeds 1.5, the resin is amorphous, and when the value is less than 0.6, the crystallinity is low, and much of the portions are amorphous. The crystalline polyester may have a crystallinity index of from 0.6 to 1.5. The crystalline polyester has a crystallinity index of preferably from 0.8 to 1.3, more preferably from 0.9 to 1.1, and even more preferably from 0.98 to 1.05, from the viewpoint of low-temperature fixing ability. In addition, the extent of the crystallinity can be adjusted by the kinds of the raw material monomers and a ratio thereof, preparation conditions (for example, reaction temperature, reaction time, cooling rate), and the like.

In one embodiment, thermoplastic polymer is a polyester, as described in the U.S. Pat. No. 3,910,840, incorporated herein by reference. Such polyesters comprise crystalline polyesters stable polyester lattices comprising admixing under high shear agitation a polyester having an acid content of at least about 0.02 milliequivalents per gram of polyester with sufficient aqueous basic solution to render the pH of the resulting latex above at least about 8. The termination of such polyester chains may either be by an acid, hydroxyl or ester function. Either hydroxyl or ester termination can be thermally degraded in a controllable manner to form the required acid-containing polyesters. Thermal degradation provides a controllable means of regulating the acid content of polyesters. Polyesters pretreated in this manner have been found to be readily emulsifiable upon reaction with a basic solution. Controlled degradation can be obtained by heating the polyester at temperatures about the melting point, generally ranging from at least about 200° C., to below the degradation temperature of the polyester. This will, of course, vary with the particular polyester employed. Heating is continued until the desired acid content is obtained. Depending upon the nature of the particular polyester and the temperature employed, heating can be continued for from about 1 to about 2 hours. The acid groups in the polymer whether present initially in the molecule of formed by the controlled degradation described hereinabove need not be limited to carboxylic acid groups. Instead the acid group can be any acid group such as carboxylic, phosphonic, sulfonic and/or their metal salts. In the event the metal salts of these acids are employed, the need for admixture with a basic solution is reduced and may even be eliminated. However, the pH of the resulting emulsion must still be at least about 8, and preferably, at least about 10 in order to obtain a stable emulsion. These acid groups may be chemically attached to the polymer molecule by means well known in the art. For example, these groups may be present on the starting monomers used to form the polymer or they can be grafted to the polymer after polymerization. The polyester has a minimum acid content of at least about 0.02 milliequivalents pre gram of polyester. The acid content ranges from about 0.05 to about 1.5 milliequivalents per gram of polyester. Exemplary polyesters can be either crystalline or amorphous polyesters exhibiting an acid content of at least 0.02 milliequivalents per gram of polyester. The polyesters can be of varying molecular weight, for example, relatively low molecular weight are preferred. Polyesters exhibiting a molecular weight (Mw) less than about 20,000 are most preferred. Illustrative polyesters are poly (xylylene sebacate), poly(diethylene glycol terephthalate), poly (1,2 propylene isophthalate), poly(hexamethylene sebacate), poly (1,2 propylene terephthalate), the condensation product of 1,2 propylene glycol, hydroquinone di-(β-hydroxyethyl)ether and terephyhalic acid or an ester thereof, the propylene glycol adduct of bisphenol A condensed with terephthalic, isophthalic or phthalic acid and copolymers thereof with propylene glycol, and the like.

In one embodiment, thermoplastic polymer is a polyester, as described in the US Publication No. 2003/0232268, incorporated herein by reference. Such polyesters comprise a hydrophilic sulfonated polyester resin of the formula

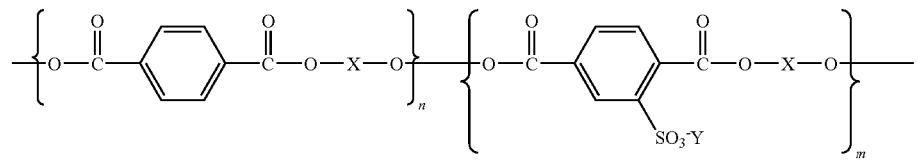

wherein Y is an alkali metal; X is selected from the group consisting of an alkylene, an oxy alkylene, and the like; and n and m represent the number of segments; a process wherein each of n and m represent a number of from about 3,000 to about 7,000, or from about 4,000 to about 6,000; process wherein the wax is a Carnauba wax, a paraffin wax, a montan wax, a microcrystalline polyethylene wax, a polybutylene wax, a polyethylene-acrylic wax, a polyester wax, a polyamide wax, a known Fischer-Tropasch wax, or mixture thereof; a process wherein each of the alkylene and the oxyalkylene contains from about 2 to about 20 carbon atoms; a process wherein the Y alkali is sodium, lithium, potassium, rubidium, cesium, hydrogen or mixtures thereof. Wherein the polyester is copoly(1,2-propylene-dipropylene-5-sulfoisophthalate)-copoly(1,2-propylene-dipropylene terephthalate), the magnesium salt of copoly(1,2-propylene-diethylene-5-sulfoisophthalate)-co-poly(1,2-propylene-diethylene terephthalate), the calcium salt of copoly(1,2-propylene-dipropylene-5-sulfoisophthalate)-copoly(1,2-propylen-e-dipropylene terephthalate), the barium salt of copoly(1,2-propylene-diet-hylene-5-sulfoisophthalate)-co-poly(1,2-propylene-diethylene terephthalate), and the like optionally including mixtures thereof. wherein the polyester is selected from the group consisting of sodio copoly(1,2-propylene-dipropylene-5-sulfoisophth-alate)-copoly(1,2-propylene-dipropylene terephthalate), lithio copoly(1,2-propylene-diethylene-5-sulfoisophthalate)-copoly(1,2-propylene-1-diethylene terephthalate), potasio copoly(1,2-dipropylene-5-sulfoisophtha-late)-copoly(1,2-propylene terephthalate), sodio copoly(1,3-butylene-5-sul-foisophtha-late)-copoly(1,3-butylene terephthalate), lithio copoly(1,2-dipropylene-5-sulfoisophthalate)-copoly(1,2-propylene terephthalate), potasio copoly(1,3-butylene-5-sulfoisophtha-late)-copoly(1-,3-butylene terephthalate), sodio copoly(1,2-propylene-diethylene-5-sulfoi-sophthalate)-copoly(1,2-pro-pylene-diethylene terephthalate), lithio copoly(1,2-dipropylene-5-sulfo isophthalate)-copoly(1,2-propylene terephthalate), potasio copoly(1,3-butylene-5-sulfoisophtha-late)-copoly(1-,3-butylene terephthalate), and sodio copoly (1,2-dipropylene-5-sulfoisopht-halate)-copoly(1,2-propylene terephthalate), potasio copoly(1,3-butylene-5-sulfoisophthalate)-copoly(1,3-butylene terephthalate). Illustrative examples of polyesters include, for example, a sulfonated polyester resin as illustrated, for example, in U.S. Pat. Nos. 5,348,832; 5,853,944; 5,840,462; 5,660,965; 5,658,704; 5,648,193; and 5,593,807; the disclosures of each patent being totally incorporated herein by reference, and for example, wherein the polyester is of the formula

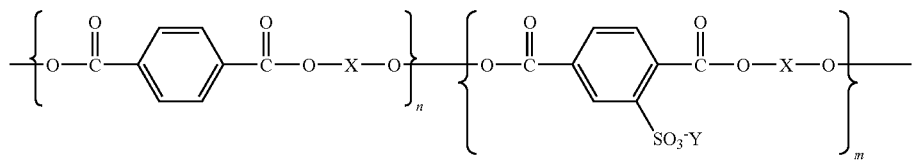

wherein Y is an alkali metal for the first polyester, such as sodium; X is an alkylene, and n and m represent the number of segments, and wherein each is, for example, a number of about 5 to about 5,000, and more specifically, from about 1,000 to about 2,000, and wherein the weight average molecular weight of the polyester is, for example, from about 2,000 grams per mole to about 100,000 grams per mole, and more specifically, from about 4,000 to about 70,000 grams per mole; the number average molecular weight is from about 1,000 grams per mole to about 50,000 grams per mole, and more specifically, from about 2,000 to about 20,000 grams per mole, and the polydispersity thereof is, for example, from about 2 to about 18, and more specifically, from about 2 to about 7, as measured by gel permeation chromatography. Wherein the formula of the polyester resin is

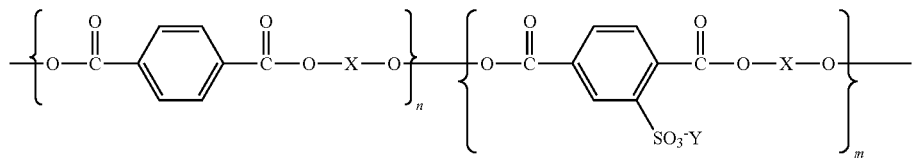

wherein Y is an alkali (II) metal, such as a magnesium ($Mg^{++}$), beryllium ($Be^{++}$), calcium ($Ca^{++}$); X is as indicated herein; and n and m represent the number of segments of about 10 to about 1,000 each, and wherein the weight average molecular weight is from about 2,000 grams per mole to about 100,000 grams per mole, the number average molecular weight is from about 1,000 grams per mole to about 50,000 grams per mole, and the polydispersity is from about 2 to about 18 as measured by gel permeation chromatography. Polyester examples are as indicated herein, and more specifically, examples of a number of polyesters are the beryllium salt of copoly(1,2-propylene-dipropylene-5-sulfoisophthalate)-copoly(1,2-propylen-e-dipropylene terephthalate), the barium salt of copoly(1,2-propylene-diet-hylene-5-sulfoisophthalate)-copoly(1,2-propylene-diethylene terephthalate), the magnesium salt of copoly(1,2-dipropylene-5-sulfoisoph-thalate)-copoly(1,2-propylene terephthalate), the magnesium salt of copoly(1,3-butylene-5-sulfoisophthalate)-copoly(1,3-butylene terephthalate), the calcium salt of copoly(1,2-dipropylene-5-sulfoisophth-alate)-copoly(1,2-propylene terephthalate), the calcium salt of copoly(1,3-butylene-5-sulfoisophthalate)-copoly(1,3-butylene terephthalate), the cobalt salt of copoly(1,2-propylene-diethylene-5-sulf-isophthalate)-copoly(1,2-propylene-diethylene terephthalate), the nickel salt of copoly(1,2-dipropylene-5-sulfoisophthalate)-copoly(1,2-propylene terephthalate), the iron salt of copoly(1,3-butylene-5-sulfoisophthalate)-1-copoly(1,3-butylene terephthalate), the zirconium salt of copoly (1,2-dipropylene-5-sulfo isophthalate)-copoly(1,2-propylene terephthalate), the chromium salt of copoly(1,3-butylene-5-sulfoisophthal-ate)-copoly(1,3-butylene terephthalate), and the like.

In one embodiment, thermoplastic polymer is a polyester, as described in the U.S. Pat. No. 6,395,445, incorporated herein by reference. Such polyesters comprise crystalline polyesters, the polyester, most preferably a sulfonated polyester, may be formed from any suitable acid and alcohol. Preferably, the polyester is derived from one or more terephthalates and one or more glycols. For example, the polyester may be derived from a reaction that includes, for example, three glycol components. In a most preferred embodiment herein, the polyester is a sulfonated polyester derived from a reaction of dimethylterephthalate, sodium dimethyl 5-sulfoisophthalate, propanediol, diethylene glycol and dipropylene glycol. Additional examples of sulfonated polyesters which may be used in the present invention include those illustrated in U.S. Pat. Nos. 5,593,807 and 5,945,245, the disclosures of which are totally incorporated herein by reference, for example including sodium sulfonated polyester, and more specifically, a polyester such as poly(1,2-propylene-sodio 5-sulfoisophthalate), poly(neopentylene-sodio 5-sulfoisophthalate), poly(diethylene-sodio 5-sulfoisophthalate), copoly(1,2-propylene-sodio 5-sulfoisophthalate)-copoly-(1,2-propylene-terephthalate-phthalate), copoly(1,2-propylene-diethylene-sodio 5-sulfoisophthalate)-copoly-(1,2-propylene-diethylene-terephthalate-phthalate), copoly(ethylene-neopentylene-sodio 5-sulfoisophthalate)-copoly-(ethylene-neopentylene-terephthalate-phthalate), and copoly(propoxylated bisphenol A)-copoly-(propoxylated bisphenol A-sodio 5-sulfoisophthalate). The sulfonated polyesters may in embodiments be represented by the following formula, or random copolymers thereof wherein the n and p segments are separated.

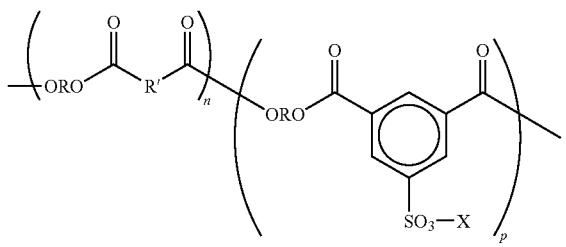

wherein R is an alkylene of, for example, from 2 to about 25 carbon atoms such as ethylene, propylene, butylene, oxyalkylene diethyleneoxide, and the like; R' is an arylene of, for example, from about 6 to about 36 carbon atoms, such as a benzylene, bisphenylene, bis(alkyloxy)bisphenolene, and the like; and p and n represent the number of randomly repeating segments, such as for example from about 10 to about 10,000. The alkali sulfopolyester possesses, for example, a number average molecular weight (Mn) of from about 1,500 to about 50,000 grams per mole and a weight average molecular weight (Mw) of from about 6,000 grams per mole to about 150,000 grams per mole as measured by gel permeation chromatography and using polystyrene as standards.

In one embodiment, thermoplastic polymer is a polyester, as described in the US Publication No. 2006/0223934, incorporated herein by reference. Such polyesters comprise crystalline polyesters, Examples of crystalline resins suitable for use herein include, for example, alkali sulfonated polyester resin. Specific crystalline resin examples include by are not limited to alkali copoly(5-sulfoisophthaloyl)-copoly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl)-copoly(propylene-succinate), alkali copoly(5-sulfoisophthaloyl)-copoly(butylenes-succinate), alkali copoly(5-sulfoisophthaloyl)-copoly(pentylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), poly(octylene-adipate), and wherein alkali is a metal such as sodium, lithium or potassium. The crystalline resin can possess various melting points of, for example, from about 30° C. to about 120° C., and preferably from about 50° C. to about 90° C., and, for example, a number average molecular weight (Mn), as measured by gel permeation chromatography (GPC) of, for example, from about 1,000 to about 50,000, and preferably from about 2,000 to about 25,000; with a weight average molecular weight (Mw) of the resin of, for example, from about 2,000 to about 100,000, and preferably from about 3,000 to about 80,000, as determined by Gel Permeation Chromatography using polystyrene standards. The molecular weight distribution (Mw/Mn) of the crystalline resin is, for example, from about 2 to about 6, and more specifically, from about 2 to about 4. The linear and branched amorphous sulfonated polyester resins, in embodiments possess, for example, a number average molecular weight (Mn), as measured by GPC, of from about 10,000 to about 500,000, and preferably from about 5,000 to about 250,000; a weight average molecular weight (Mw) of, for example, from about 20,000 to about 600,000, and preferably from about 7,000 to about 300,000, as determined by GPC using polystyrene standards; and a molecular weight distribution (Mw/Mn) of, for example, from about 1.5 to about 6, and more specifically, from about 2 to about 4. The linear amorphous polyester resins are generally prepared by the polycondensation of an organic diol and a diacid or diester, at least one of which is sulfonated or a sulfonated difunctional monomer being included in the reaction, and a polycondensation catalyst. For the branched amorphous sulfonated polyester resin, the same materials may be used, with the further inclusion of a branching agent such as a multivalent polyacid or polyol.

In one embodiment, thermoplastic polymer is a polyester, as described in the US Publication No. 2007/088119, incorporated herein by reference. Such polyesters comprise crystalline polyesters, the polyester contained in the resin containing acidic group may be either a crystalline polyester or an amorphous polyester. The degree of crystallinity of the polyester may be expressed by a crystallinity index defined by a ratio of a softening point to a maximum endothermic peak temperature as measured by a differential scanning colorimeter (softening point/maximum endothermic peak temperature). In general, when the above ratio exceeds 1.5, the resin becomes amorphous, whereas when the ratio is less than 0.6, the resin exhibits a low crystallinity and contains a large amount of an amorphous portion. Therefore, the crystalline polyester preferably has a crystallinity index of 0.6 to 1.5. In view of good low-temperature fusing ability, the crystallinity index of the crystalline polyester is more preferably from 0.8 to 1.3 and even more preferably from 0.9 to 1.1. The degree of crystallinity of the polyester may be controlled according to the kinds and blending ratios of raw monomers, production conditions (such as, e.g., reaction temperature, reaction time and cooling rate), etc. Here, the maximum endothermic peak temperature means a temperature of such a peak located on a highest temperature side among endothermic peaks observed. When a difference between the maximum endothermic peak temperature and the softening point is within 20° C., the peak temperature is regarded as a melting point, whereas when the difference between the maximum endothermic peak temperature and the softening point exceeds 20° C., the peak is regarded as a peak attributed to a glass transition of the resin. The methods of measuring the softening point and the endothermic maximum peak temperature which define the crystallinity index, are explained in detail below. The resin contains an acid group, and the acid group is preferably bonded to a terminal end of a molecule of the resin containing acidic group. Examples of the acid group include a carboxyl group, a sulfonic group, a phosphonic group and a sulfinic group. Among these acid groups, from the viewpoint of satisfying both good emulsifiability of the resin and good environmental resistance of the resulting toner, preferred is a carboxyl group. The amount of the acid group bonded to a terminal end of a molecule of the resin containing acidic group is an important factor for attaining good stability of emulsified particles and determining the particle size distribution and particle size of the resulting toner. The resin binder preferably has an acid value of 10 to 50 mg KOH/g, more preferably 12 to 45 mg KOH/g, even more preferably 15 to 40 mg KOH/g and even more preferably 15 to 30 mg KOH/g in order to stabilize the emulsified particles and obtain a toner having a small particle size and a narrow particle size distribution. The amorphous polyester suitably satisfies at least one property selected from a softening point of 95 to 160° C., a glass transition point of 50 to 75° C., an acid value of 1 to 40 mg KOH/g and a hydroxyl value of 3 to 60 mg KOH/g. The number-average molecular weight of the amorphous polyester is preferably from 1,000 to 100,000, more preferably from 1,000 to 50,000 and even more preferably from 1,000 to 12,000 from the viewpoint of good durability and good fusing ability. The content of the amorphous polyester in the resin binder is preferably 60% by weight or more and more preferably 70% by weight or more from the viewpoint of good durability and good chargeability of the resulting toner. When the crystalline polyester is used in order to achieve good low-temperature fusing ability, the number-average molecular weight of the crystalline polyester is preferably from 2,000 to 100,000, more preferably from 2,000 to 20,000, even more preferably from 2,000 to 10,000 and even more preferably from 2,000 to 8,000 from the viewpoints of good emulsifiability, good fusing ability and good offset resistance. The softening point or melting point of the crystalline polyester is preferably from 60 to 150° C., more preferably from 60 to 130° C. and even more preferably from 60 to 120° C. from the viewpoint of good low-temperature fusing ability.

In one embodiment, thermoplastic polymer is a polyester, as described in the US Publication No. 2007/0212628, incorporated herein by reference. Such polyesters comprise crystalline polyesters, examples of the resin binder include polyesters, styrene-acryl resins, epoxy resins, polycarbonates and polyurethanes. Among these resins, preferred are polyesters and styrene-acryl copolymers, and more preferred are polyesters in view of good dispersibility of colorants therein, good fixing property and good durability. The content of the polyesters in the resin binder is preferably 60% by weight or more, more preferably 70% by weight or more and even more preferably 80% by weight or more. The polyester contained in the resin binder may be either a crystalline polyester or an amorphous polyester. The polyester preferably contains an acid group bonded to a terminal end of a molecular chain thereof. Examples of the acid group include a carboxyl group, a sulfonic group, a phosphonic group and a sulfinic group. Among these acid groups, in view of achieving both good emulsification of the resin and good environmental resistance of a toner produced using the polyester resin, preferred is a carboxyl group. The amount of the acid groups bonded to a terminal end of a molecular chain of the polyester is an important factor for attaining good stability of emulsified particles and determining the particle size distribution and particle size of the resulting toner. In order to stabilize the emulsified particles and obtain a toner having a small particle size and a sharp particle size distribution, the amount of the acid groups bonded to a terminal end of a molecular chain of the polyester is preferably from 0.015 to 0.9 mmol, more preferably from 0.08 to 0.85 mmol, even more preferably from 0.15 to 0.8 mmol and even more preferably from 0.25 to 0.75 mmol per 1 g of the polyester. The acid value of the polyester is, for example, preferably from 1 to 50 mg KOH/g, more preferably from 5 to 48 mg KOH/g, even more preferably from 10 to 45 mg KOH/g and even more preferably from 15 to 40 mg KOH/g in order to stabilize the emulsified particles and to obtain a toner having a small particle size and a sharp particle size distribution. Also, if required, a carboxyl group may be introduced into a main molecular chain of the polyester by using the carboxylic acid component composed of a polyvalent acid such as trimellitic acid and the alcohol component composed of a polyhydric alcohol such as pentaerythritol. The amount of the acid group contained in the main molecular chain of the polyester is preferably 5 mol % or less, more preferably 3 mol % or less and even more preferably 1 mol % or less on the basis of the number of moles of the whole carboxylic acid components constituting the polyester. From the same viewpoints as described above, the molar ratio of the acid groups contained in the main molecular chain of the polyester to the acid groups bonded to the terminal end of the molecular chain of the polyester (moles of acid groups contained in main molecular chain of polyester/moles of acid groups bonded to terminal end of molecular chain of polyester) is preferably 30 mol % or less, more preferably 20 mol % or less, even more preferably 10 mol % or less, even more preferably 5 mol % or less and even more preferably 2 mol % or less. The amount of the acid groups contained in the main molecular chain of the polyester and the acid groups bonded to the terminal end of the molecular chain of the polyester may be respectively calculated from the structures of the raw acid and the raw alcohol of the polyester, the ratio between these raw components charged, the number-average molecular weight of the polyester, and the measurement of the acid value of the polyester. In addition, the amount of these acid groups may be determined by using the measurement of the acid value of the polyester in combination with a nuclear magnetic resonance spectroscopic method (NMR) or photoelectric spectroscopic method (XPS, ESCA, etc.). The content of the polyester in the toner is preferably 60% by weight or higher, more preferably 70% by weight or more and even more preferably from 80 to 95% by weight. The polyester may be produced, for example, by polycondensing the alcohol component and the carboxylic acid component in an inert gas atmosphere at a temperature of about 180 to 250° C., if required, by using an esterification catalyst. The melting point of the crystalline polyester is preferably from 60 to 150° C., more preferably from 60 to 130° C. and even more preferably from 60 to 120° C. in view of good low-temperature fixing property. The softening point of the amorphous polyester is preferably from 95 to 160° C., and the glass transition point thereof is preferably from 50 to 75° C. The number-average molecular weight of the crystalline polyester is preferably from 2,000 to 100,000, more preferably from 2,000 to 20,000, even more preferably from 2,000 to 10,000 and even more preferably from 2,000 to 8,000 in view of good emulsifiability, good fixing property and good offset resistance. The number-average molecular weight of the amorphous polyester is preferably from 1,000 to 100,000, more preferably from 1,000 to 50,000 and even more preferably from 1,000 to 12,000 in view of good durability and good fixing property. The number-average molecular weight of the polyester may be determined by a gel permeation chromatography using polystyrene as a standard sample.

In one embodiment, thermoplastic polymer is a polyester, as described in the US Publication No. 2007/0219313, incorporated herein by reference. Such polyesters comprise crystalline polyesters, the polyester exhibits an excellent hydrolysis resistance. The softening point of the polyester is preferably from 80 to 160° C., more preferably from 85 to 150° C., even more preferably from 90 to 145° C. and further even more preferably from 95 to 140° C. in view of a good fixing property and a good durability. The glass transition point of the polyester is preferably from 40 to 70° C., more preferably from 45 to 70° C. and even more preferably from 50 to 67° C. in view of a good fixing property and a good durability. The acid value of the polyester is preferably from 1 to 40 mg KOH/g, more preferably from 2 to 35 mg KOH/g and even more preferably from 3 to 30 mg KOH/g.

In one embodiment, thermoplastic polymer is a polyester, as described in the US Publication No. 2008/006311, incorporated herein by reference. Such polyesters comprise crystalline polyesters, examples of the resin binder containing acid group include known resins for toners such as polyesters, styrene-acryl copolymers, epoxy resins, polycarbonates and polyurethanes. Among these resins, preferred are polyesters and styrene-acryl copolymers, and more preferred are polyesters, from the viewpoints of a good dispersibility of colorants therein, a good fusing property and a good durability. The content of the polyester in the resin binder is preferably 60% by weight or larger, more preferably 70% by weight or larger, even more preferably 80% by weight or larger and further even more preferably 90% by weight or larger. In the present invention, these resins may be used as the resin binder alone or in combination of any two or more thereof. The polyester contained in the resin binder containing acid group may be either a crystalline polyester or an amorphous polyester. The polyester has a softening point of preferably from 80 to 165° C. and more preferably from 95 to 160° C., and a glass transition point of preferably from 50 to 85° C. and more preferably from 50 to 75° C. in view of a good storage property of the resultant toner. The Polyester has an acid value of preferably from 6 to 30 mg KOH/g, more preferably from 6.5 to 29 mg KOH/g and even more preferably from 7 to 28 mg KOH/g, and a hydroxyl value of preferably from 3 to 60 mg KOH/g. The weight-average molecular weight of the polyester is preferably from 5,000 to 150,000 and more preferably from 10,000 to 120,000, and the number-average molecular weight of the polyester is preferably from 1,000 to 100,000, more preferably from 1,000 to 50,000 and even more preferably from 1,000 to 12,000 from the viewpoints of a good durability and a good fusing property. The resin binder used in the present invention contains an acid group. In particular, the acid group is preferably bonded to a terminal end of a molecular chain of the resin binder containing acid group. Examples of the acid group include a carboxyl group, a sulfonic group, a phosphonic group and a sulfinic group. Among these acid groups, from the viewpoint of satisfying both a good emulsifiability of the resin and a good environmental resistance of the resultant toner, preferred is a carboxyl group. The amount of the acid group bonded to a terminal end of a molecular chain of the resin binder containing acid group is one of important factors for attaining a good stability of emulsified particles and determining a particle size distribution and a particle size of the resultant toner. The resin binder has an acid value of preferably from 6 to 30 mg KOH/g, more preferably from 6.5 to 29 mg KOH/g and even more preferably from 7 to 28 mg KOH/g in order to stabilize the emulsified particles and obtain a toner having a small particle size and a narrow particle size distribution. The resin binder preferably has a softening point of 80 to 165° C. and a glass transition point of 50 to 85° C. The weight-average molecular weight and number-average molecular weight of the resin binder are preferably similar to those of the above polyester.

In one embodiment, thermoplastic polymer is a polyester, as described in the US Publication No. 2009/0123865, incorporated herein by reference. Such polyesters comprise crystalline polyesters, illustrative examples of resins include polyethylene-terephthalate, polypropylene-terephthalate, polybutylene-terephthalate, polypentylene-terephthalate, polyhexylene-terephthalate, polyheptadene-terephthalate, polyoctalene-terephthalate. Sulfonated polyesters such as sodio sulfonated polyesters as described in, for example, U.S. Pat. No. 5,593,807, may also be used. Additional resins, such as polyester resins, are as indicated herein and in the appropriate U.S. patents recited herein, and more specifically, examples further include copoly(1,2-propylene-dipropylene-5-sulfoisophthalate)-copoly(1,2-propylen-e-dipropylene terephthalate), copoly(1,2-propylene-diethylene-5-sulfoisophthalate)-copoly(1,2-propylene-1-diethylene terephthalate), copoly(propylene-5-sulfoisophthalate)-copoly(1,2-propylene terephthalate), copoly(1,3-butylene-5-sulfoisophthalate)-copoly(1,3-butylene terephthalate), copoly(butylenesulfoisophthalate)-copoly(1,3-butylene terephthalate), and the like. In embodiments, the resin is a styrene butylacrylate resin.

In one embodiment, thermoplastic polymer is a polyester, as described in the US Publication No. 2009/0123863, incorporated herein by reference. Such polyesters comprise crystalline polyesters, the resin binder contains a crystalline polyester having a specified molecular weight, in a specified amount. "Crystallization ratio" means a proportion of a crystalline part in a system containing a melt-kneaded product or the like, based on a proportion of a crystalline part in the crystalline polyester used. In addition, "main component" as used herein refers to a component contained in an amount of 95% by weight or more of the resin binder. The crystallinity of the resin is expressed as a ratio of a softening point to a highest temperature of endothermic peak determined with a differential scanning calorimeter, i.e., softening point/highest temperature of endothermic peak. Generally, when the above-mentioned value exceeds 1.5, the resin is amorphous; and when the value is less than 0.6, the resin is low in crystallinity and mostly amorphous. The crystallinity of the resin can be adjusted by the kinds of the raw material monomers and a ratio thereof, production conditions (for example, reaction temperature, reaction time, and cooling rate), and the like. Crystalline polyester may be a polyester having a ratio of softening point/highest temperature of endothermic peak of from 0.6 to 1.5, and preferably from 0.8 to 1.2, and amorphous resin may be a resin having a ratio of softening point/highest temperature of endothermic peak, of more than 1.5, or less than 0.6, and preferably more than 1.5. The crystalline polyester has a number-average molecular weight of from 5,000 to 10,000, and preferably from 6,000 to 9,000. Crystalline polyester contains high-molecular weight component in a certain amount, from the viewpoint of durability of the toner; therefore, the crystalline polyester has a weight-average molecular weight (Mw) of from 40,000 to 150,000, and preferably from 50,000 to 120,000. The crystalline polyester has a ratio of the weight-average molecular weight (Mw) to the number-average molecular weight (Mn), i.e., Mw/Mn, of preferably from 5 to 20, more preferably from 6 to 18, and even more preferably from 8 to 15, from the viewpoint of durability of the toner. The crystalline polyester has a highest temperature of endothermic peak determined with a differential scanning calorimeter of from 100° to 140° C., preferably from 110° to 140° C., more preferably from 110° to 130° C., and even more preferably from 110° to 120° C., from the viewpoint of fixing ability, storage property and durability of the toner. The crystalline polyester has a softening point of preferably from 70° to 140° C., more preferably from 90° to 130° C., even more preferably from 90° to 110° C., and even more preferably from 90° to 100° C., from the viewpoint of low-temperature fixing ability of the toner. It is preferable that the amorphous resin contains two different kinds of amorphous polyesters of which softening points differ by preferably 10° C. or more, and more preferably 10° to 60° C., from the viewpoint of low-temperature fixing ability and offset resistance of the toner. The low-softening point polyester has a softening point of preferably from 80° to 120° C., and more preferably from 90° to 120° C., from the viewpoint of low-temperature fixing ability of the toner. The high-softening point polyester has a softening point of preferably from 120° to 150° C., and more preferably from 120° to 140° C., from the viewpoint of offset resistance. Here, when the amorphous resin is composed of three or more kinds of resins, it is preferable that the two kinds of resins contained in larger amounts satisfy the above. For example, when the second and third resins in descending order are contained in the same amount, it is preferable that the resin contained in a largest amount and either of the second resins satisfy the above. The weight ratio of the high-softening point polyester to the low-softening point polyester, i.e., high-softening point polyester/ low-softening point polyester, is preferably from 1/9 to 9/1, and more preferably from 2/8 to 8/2. In addition, in order to further improve durability of the toner, high-softening point polyester/low-softening point polyester is preferably from 8/2 to 5/5, and in order to further improve low-temperature fixing ability of the toner, high-softening point polyester/low-softening point polyester is preferably from 4/6 to 2/8. When the amorphous resin contains two or more amorphous polyesters, the amorphous resin has an average softening point of preferably from 100° to 140° C., and more preferably from 110° to 130° C., from the viewpoint of low-temperature fixing ability of the toner. In the present paragraph, an average softening point refers to a weighed average softening point. The amorphous resin has a glass transition temperature of preferably from 40° to 70° C., and more preferably from 50° to 70° C., from the viewpoint of low-temperature fixing ability and durability of the toner. The amorphous resin has an acid value of preferably from 5 to 25 mgKOH/g, and more preferably from 5 to 20 mgKOH/g. The amorphous resin may be a polyester that has been modified to an extent that the polyester does not substantially impair the properties. The modified polyester includes a polyester grafted or blocked with phenol, urethane, epoxy, or the like, according to a method described in JP-A-Hei-11-133668, JP-A-Hei-10-239903, JP-A-Hei-8-20636, or the like, and a composite resin having two or more kinds of resin units including a polyester unit.

In one embodiment, thermoplastic polymer is a polyester, as described in the US Publication No. 2009/0123862, incorporated herein by reference. Such polyesters comprise crystalline polyesters, an amorphous polyester, which may be a homopolymer or copolymer of two or more monomers. Suitable polyesters include, in embodiments, those derived from a dicarboxylic acid and a diphenol. Examples of such resins include those disclosed in U.S. Pat. No. 3,590,000, the disclosure of which is hereby incorporated by reference in its entirety. Suitable amorphous polyester materials also include those commercially available as GTUF and FPESL-2 from Kao Corporation, Japan, and EM181635 from Reichhold, Research Triangle Park, N.C., and the like. This resin may be used in a linear form, or partially crosslinked as described in U.S. Pat. No. 6,359,105, the disclosure of which is hereby incorporated by reference in its entirety. In embodiments, a blend of a linear resin and a partially crosslinked resin may be used to adjust the rheology of the resulting toner. Branched amorphous resins which may be utilized in embodiments of the present disclosure include branched polyesters, branched polyamides, branched polyimides, branched polystyrene-acrylates, branched polystyrene-methacrylates, branched polystyrene-butadienes, or branched polyester-imides, branched alkali sulfonated polyesters, branched alkali sulfonated polyamides, branched alkali sulfonated polyimides, branched alkali sulfonated polystyrene-acrylates, branched alkali sulfonated polystyrene-methacrylates, branched alkali sulfonated polystyrene-butadienes, or branched alkali sulfonated polyester-imides, branched sulfonated polyester resins, branched copoly(ethylene-terephthalate)-copoly(ethylene-5-sulfo-isophthalate), branched copoly(propylene-terephthalate)-copoly(propylene-5-sulfo-isophthalate), branched copoly(diethylene-terephthalate)-copoly(diethylene-5-sulfo-isophthalate), branched copoly(propylene-diethylene-terephthalate)-copoly(propylene-diet-hylene-5-sulfo-isophthalate), branched copoly(propylene-butylene-terephthalate)-copoly(propylene-butylene-5-sulf-o-isophthalate), branched copoly(propoxylated bisphenol-A-fumarate)-copoly (propoxylated bisphenol A-5-sulfo-isophthalate), branched copoly(ethoxylated bisphenol-A-fumarate)-copoly(ethoxylated bisphenol-A-5-sulfo-isophthalate), or branched copoly(ethoxylated bisphenol-A-maleate)copoly(ethoxylated bisphenol-A-5-sulfo-isophthalate), combinations thereof, and the like. The amorphous polyester may have a glass transition temperature of from about 50° C. to about 65° C., in embodiments from about 54° C. to about 62° C. A crystalline resin which may be utilized in forming a toner may include, for example, a polyester, a polyamide, a polyimide, a polyolefin such as a polyethylene, a polypropylene, a polybutylene or an ethylene-propylene copolymer, a polyisobutyrate, an ethylene-vinyl acetate copolymer, combinations thereof, and the like. In embodiments, the crystalline polyester material may be derived from a monomer system including a diol and a diacid such as a dicarboxylic acid. Examples of suitable crystalline resins include, but are not limited to, poly(1,10-decamethylene sebacate), poly(1,9-nonyl dodecanoate), poly(1,9-nonyl sebacate), poly(1,6-hexamethylene sebacate), poly(1,12-dodecamethylene dodecanoate), poly(1,4-butylene dodecanoate), combinations thereof, and the like. For example, in embodiments the crystalline polyester may be derived from a 10 carbon diol such as 1,10-decanediol and an 8 carbon dicarboxylic acid such as suberic acid. The amorphous resin and crystalline resin may be combined to form a binder resin which, in turn, may be utilized to form a toner. The amorphous resin may be present in an amount from about 10 to about 90 percent by weight of the combination of amorphous resin and crystalline resin (i.e., the binder resin), in embodiments from about 65 to about 85 percent by weight of the binder resin. Thus, the crystalline resin may be present in an amount from about 90 to about 10 percent by weight of the combination of the binder resin, in embodiments from about 35 to about 15 percent by weight of the binder resin.

In one embodiment, thermoplastic polymer is a polyester, as described in the US Publication No. 2009/0123864, incorporated herein by reference. Such polyesters comprise crystalline polyesters, Examples of amorphous resins suitable for use herein include polyester resins, branched polyester resins, polyimide resins, branched polyimide resins, poly(styrene-acrylate) resins, crosslinked, for example from about 25 percent to about 70 percent, poly(styrene-acrylate) resins, poly (styrene-methacrylate) resins, crosslinked poly(styrene-methacrylate) resins, poly(styrene-butadiene) resins, crosslinked poly(styrene-butadiene) resins, alkali sulfonated-polyester resins, branched alkali sulfonated-polyester resins, alkali sulfonated-polyimide resins, branched alkali sulfonated-polyimide resins, alkali sulfonated poly(styrene-acrylate) resins, crosslinked alkali sulfonated poly(styrene-acrylate) resins, poly(styrene-methacrylate) resins, crosslinked alkali sulfonated-poly(styrene-methacrylate) resins, alkali sulfonated-poly(styrene-butadiene) resins, and crosslinked alkali sulfonated poly(styrene-butadiene) resins. The amorphous resin is preferably a branched amorphous sulfonated polyester resin or a linear amorphous sulfonated polyester resin. Branched amorphous sulfonated polyester resins are preferred, for example, when the fuser does not contain a fuser oil or when black or matte prints are desired. Liner amorphous sulfonated polyester resins are preferred, for example, when the fuser include an oil. Branched amorphous resins can be a polyester, a polyamide, a polyimide, a polystyrene-acrylate, a polystyrene-methacrylate, a polystyrene-butadiene, or a polyester-imide, an alkali sulfonated polyester, an alkali sulfonated polyamide, an alkali sulfonated polyimide, an alkali sulfonated polystyrene-acrylate, an alkali sulfonated polystyrene-methacrylate, an alkali sulfonated polystyrene-butadiene, or an alkali sulfonated polyester-imide, a sulfonated polyester resin, copoly(ethylene-terephthalate)-copoly(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfoisophthalate), copoly(propylene-butylene-terephthalate)-copoly(propylene-butylene-5-sulf-o-isophthalate), copoly(propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), or copoly(ethoxylated bisphenol-A-maleate)copoly(ethoxylated bisphenol-A-5-sulfo-isophthalate). The amorphous resin is, for example, present in an amount from about 50 to about 90 percent by weight, and more preferably from about 65 to about 85 percent by weight of the binder. Preferably the amorphous resin is a branched amorphous sulfonated polyester resin. The amorphous resin in preferred embodiments possesses, for example, a number average molecular weight (Mn), as measured by gel permeation chromatography (GPC), of from about 10,000 to about 500,000, and preferably from about 5,000 to about 250,000; a weight average molecular weight (Mw) of, for example, from about 20,000 to about 600,000, and preferably from about 7,000 to about 300,000, as determined by GPC using polystyrene standards; and wherein the molecular weight distribution (Mw/Mn) is, for example, from about 1.5 to about 6, and more specifically, from about 2 to about 4. The crystalline resin may be, for example, a polyester, a polyamide, a polyimide, a polyethylene, a polypropylene, a polybutylene, a polyisobutyrate, an ethylene-propylene copolymer, or an ethylene-vinyl acetate copolymer or a polyolefin. Preferably, the crystalline resins are sulfonated polyester resins. Examples of a crystalline resin that are suitable for use herein are poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), copoly(5-sulfoisophthaloyl)-copoly(ethylene-adipate), copoly(5-sulfoisophthaloyl)-copoly(propylene-adipate), copoly(5-sulfoisophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfoisophthaloyl)-copoly(ethylene-succinate), copoly(5-sulfoisophthaloyl)-copoly(propylene-succinate), copoly(5-sulfoisophthaloyl)-copoly(butylene-succinate), copoly(5-sulfoisophthaloyl)-copoly(pentylene-succinate), copoly(5-sulfoisophthaloyl)-copoly(hexylene-succinate), copoly(5-sulfoisophthaloyl)-copoly(octylene-succinate), copoly(5-sulfo-isophthaloyl)-copoly(ethylene-sebacate), copoly(5-sulfo-isophthaloyl)-copoly(propylene-sebacate), copoly(5-sulfo-isophthaloyl)-copoly(butylenes-sebacate), copoly(5-sulfo-isophthaloyl)-copoly(pentylene-sebacate), copoly(5-sulfo-isophthaloyl)-copoly(hexylene-sebacate), copoly(5-sulfo-isophthaloyl)-copoly(octylene-sebacate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), or poly(octylene-adipate). The crystalline resin in the toner most preferably displays or possesses a melting temperature of between about 70° C. and 85° C., and a recrystallization temperature of at least about 47° C., and preferably the recrystallization temperature is between about 50° C. and 65° C. Sulfonated polyester resins are most preferred as the crystalline resin herein. The crystalline resin is sulfonated from about 0.5 weight percent to about 4.5 weight percent, and preferably from about 1.5 weight percent to about 4.0 weight percent. The crystalline resin is, for example, present in an amount of from about 10 to about 50 percent by weight of the binder, and preferably from about 15 to about 40 percent by weight of the binder. The crystalline resin can possess melting points of, for example, from at least about 70° C., and preferably from about 70° C. to about 80° C., and a number average molecular weight (Mn), as measured by gel permeation chromatography (GPC) of, for example, from about 1,000 to about 50,000, and preferably from about 2,000 to about 25,000; with a weight average molecular weight (Mw) of the resin of, for example, from about 2,000 to about 100,000, and preferably from about 3,000 to about 80,000, as determined by GPC using polystyrene standards. The molecular weight distribution (Mw/Mn) of the crystalline resin is, for example, from about 2 to about 6, and more specifically, from about 2 to about 4.

In one embodiment, thermoplastic polymer is a polyester, as described in the US Publication No. 2009/0117482, incorporated herein by reference. Such polyesters comprise crystalline polyesters, as the resin binder, it is preferable that a polyester is contained, and it is more preferable that a crystalline polyester and an amorphous polyesters are used together. The crystallinity of the polyester is expressed as an index of crystallinity as defined by a ratio of a softening point to a highest temperature of endothermic peak determined by a differential scanning calorimeter, i.e., (softening point)/(highest temperature of endothermic peak). Generally, when the above-mentioned value exceeds 1.5, the resin is amorphous; and when the value is less than 0.6, the resin is low in crystallinity and mostly amorphous. The crystallinity of the resin can be adjusted by the kinds of the raw material monomers and a ratio thereof, preparation conditions (for example, reaction temperature, reaction time, and cooling rate), and the like. The crystalline polyester may have an index of crystallinity of from 0.6 to 1.5. The crystalline polyesters has an index of crystallinity of preferably from 0.8 to 1.3, more preferably from 0.9 to 1.1, and even more preferably from 0.95 to 1.05, from the viewpoint of low-temperature fixing ability. In addition, the amorphous polyester may have an index of crystallinity of more than 1.5 or less than 0.6, and preferably more than 1.5. The crystalline polyester and the amorphous polyester are both obtained from an alcohol component and a carboxylic acid component as the raw material monomers. The crystalline polyester has a melting point of preferably from 70° to 150° C., and more preferably from 90° to 130° C. The amorphous polyester has a softening point of preferably from 80° to 160° C., and more preferably from 90° to 150° C. In addition, the amorphous polyester has a glass transition temperature of preferably from 50° to 75° C., and more preferably from 53° to 65° C. The crystalline polyester and the amorphous polyester have an acid value of preferably from 3 to 40 mgKOH/g.

In one embodiment, thermoplastic polymer is a polyester, as described in the US Publication No. 2009/011745, incorporated herein by reference. Such polyesters comprise crystalline polyesters, resin binders contain a polyester-based resin (A) and a polyester-based resin (B) having a softening point of a temperature higher than the polyester-based resin (A) by 10° C. or more, wherein at least one of said polyester-based resins (A) and (B) is a resin derived from a (meth) acrylic acid-modified rosin having a polyester unit obtainable by polycondensing an alcohol component and a carboxylic acid component containing a (meth)acrylic acid-modified rosin as a raw material monomer. The resin derived from the (meth)acrylic acid-modified rosin can be fixed at a very low temperature, and has excellent storage ability. In addition, the generation of fine powder in the developer vessel is reduced. The (meth)acrylic acid-modified rosin in the present invention refers to a rosin modified with (meth)acrylic acid, and obtained by an addition reaction of (meth)acrylic acid to a rosin of which main component is abietic acid, neoabietic acid, palustric acid, pimaric acid, isopimaric acid, sandaracopimaric acid, dehydroabietic acid, levopimaric acid, or the like. The difference in the softening points of the two kinds of the polyester-based resins is 10° C. or more, from the viewpoint of increasing dispersibility of an internal additive, thereby enhancing the effects for fixing ability and offset resistance, especially high-temperature offset resistance. In an achromatic toner, such as a black toner, the difference in the softening points is preferably from 10° to 60° C., and more preferably from 20° to 50° C., from the viewpoint of controlling gloss. In addition, in a chromatic toner such as a yellow toner, a magenta toner or a cyan toner, the difference in the softening points is preferably from 10° to 30° C., and more preferably from 10° to 30° C., and more preferably from 15° to 30° C., from the viewpoint of increasing gloss. The polyester-based resin (A) having a lower softening point has a softening point of preferably from 80° to 120° C., and more preferably from 90° to 110° C., from the viewpoint of fixing ability. On the other hand, the polyester-based resin (B) having a higher softening point has a softening point of preferably from 100° to 180° C., more preferably from 120° to 180° C., and even more preferably from 120° to 160° C., from the viewpoint of high-temperature offset resistance. The polyester-based resin (A) and the polyester-based resin (B) have a glass transition temperature of preferably from 45° to 75° C., and more preferably from 50° to 70° C., from the viewpoint of fixing ability, storage ability, and durability. The polyester-based resin (A) and the polyester-based resin (B) have an acid value of preferably from 1 to 80 mg KOH/g, more preferably from 5 to 60 mg KOH/g, and even more preferably from 5 to 50 mg KOH/g, and a hydroxyl value of preferably from 1 to 80 mg KOH/g, more preferably from 8 to 50 mg KOH/g, and even more preferably from 8 to 40 mg KOH/g, from the viewpoint of triboelectric chargeability and environmental stability. In the polyester-based resin (A) and the polyester-based resin (B), the low-molecular weight component having a molecular weight of 500 or less ascribed to the residual monomer component and the oligomer component or the like is contained in an amount of preferably 12% or less, more preferably 10% or less, even more preferably 9% or less, and even more preferably 8% or less, of the polyester-based resin, from the viewpoint of low-temperature fixing ability, offset resistance, and storage ability. The amount of the low-molecular weight component contained can be reduced by a method of increasing the modified degree, or the like. Here, the amount of the low-molecular weight component contained is determined by an areal proportion of molecular weights as determined by gel permeation chromatography (GPC) as described later. In the present invention, it is preferable that the polyester units in the polyester-based resins (A) and (B) are amorphous polyesters different from crystalline polyesters. Amorphous resin may be a resin having a difference between a softening point and a glass transition temperature (Tg) of 30° C. or more. The polyester-based resin (A) and the polyester-based resin (B) are in a weight ratio of preferably from 10/90 to 90/10, more preferably from 20/80 to 80/20, and even more preferably from 30/70 to 70/30, from the viewpoint of fixing ability and durability. Where the resin binder contains three or more kinds of polyester-based resins, the polyester-based resin (A) and the polyester-based resin (B) are contained in a total amount of preferably 70% by weight or more, more preferably 80% by weight or more, even more preferably 90% by weight or more, and even more preferably essentially 100% by weight, of the resin binder. Further, in a case where both of the polyester resin (A) and the polyester resin (B) are resins derived from (meth)acrylic acid-modified rosins, the resin derived from the (meth)acrylic acid-modified rosin is contained in an amount of preferably 70% by weight or more, more preferably 80% by weight or more, even more preferably 90% by weight or more, and even more preferably substantially 100% by weight, of the resin binder. Alternatively, in a case where the polyester-based resin (A) is a resin derived from a (meth)acrylic acid-modified rosin and the polyester-based resin (B) is a resin derived from a fumaric acid/maleic acid-modified rosin, the resin derived from a (meth)acrylic acid-modified rosin and the resin derived from a fumaric acid/maleic acid-modified rosin are contained in a total amount of preferably 70% by weight or more, more preferably 80% by weight or more, even more preferably 90% by weight or more, and even more preferably substantially 100% by weight, of the resin binder. The modified polyester includes a polyester which is grafted or blocked with phenol, urethane, epoxy or the like according to methods described in, for example, JP-A-Hei-11-133668, JP-A-Hei-10-239903, JP-A-Hei-8-20636, and the like; and a composite resin having two or more kinds of resin units including a polyester unit.

In one embodiment, thermoplastic polymer is a polyester, as described in the U.S. Pat. No. 7,528,218, incorporated herein by reference. Such polyesters comprise crystalline polyesters, a polyester for a toner obtained by polycondensing an alcohol component and a carboxylic acid component containing an alkylsuccinic acid, an alkenylsuccinic acid, or a mixture thereof, each having 10 or more carbon atoms, and has a feature that 6-methyl-2-heptanone and 5-methyl-2-heptanone are detected in an amount within a certain range as determined by thermal desorption-gas chromatography-mass spectrometry (TD-GC/MS). The polyester for a toner of the present invention has a softening point of preferably from 70° to 170° C., more preferably from 80° to 160° C., and even more preferably from 90° to 155° C., from the viewpoint of low-temperature fixing ability, fixable region, and storage property of a toner. Also, the polyester has a glass transition temperature of preferably from 40° to 80° C., and more preferably from 50° to 65° C., from the viewpoint of low-temperature fixing ability and storage property of the resulting toner. The polyester has an acid value of preferably from 1 to 40 mgKOH/g, and more preferably from 2 to 30 mgKOH/g, from the viewpoint of chargeability and environmental stability of the resulting toner.

In one embodiment, thermoplastic polymer is a polyester, as described in the U.S. Pat. No. 7,524,599, incorporated herein by reference. Such polyesters comprise crystalline polyesters, in embodiments, the polyester resin includes any suitable polyester resin or mixture of polyester resins, such as crystalline polyester resins. The crystalline resins, which are available from a number of sources, can be prepared by a polycondensation process by reacting an organic diol, and an organic diacid in the presence of a polycondensation catalyst. Examples of crystalline based polyester resins include alkali copoly(5-sulfo-isophthaloyl)-co-poly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(octylene-adipate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-co-poly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly(ethylene-succinate), alkali copoly(5-sulfo-isophthaloyl-copoly(butylene-succinate), alkali copoly(5-sulfo-isophthaloyl)-copoly(hexylene-succinate), alkali copoly(5-sulfo-isophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-iosphthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), poly(octylene-adipate); and wherein alkali is a metal of sodium, lithium or potassium, and the like. In embodiments, the alkali metal is lithium. The polyester resin, such as crystalline polyester resin, can possess various melting points of, for example, from about 30° C. to about 120° C., or from about 35° C. to about 90° C. such as from about 40° C. to about 80° C. The polyester resin may have, for example, a number average molecular weight ($M_n$), as measured by gel permeation chromatography (GPC) of from about 1,000 to about 50,000, or from about 2,000 to about 25,000. The weight average molecular weight ($M_w$) of the crystalline polyester resin may be, for example, from about 2,000 to about 100,000, and from about 3,000 to about 80,000, as determined by gel permeation chromatography using polystyrene standards. The molecular weight distribution ($M_w/M_n$) of the crystalline polyester resin may be, for example, from about 2 to about 6, and more specifically, from about 2 to about 4.

In one embodiment, thermoplastic polymer is a polyester, as described in the EP Pat. No. 1736833, incorporated herein by reference. Such polyesters comprise crystalline polyester resins and an amorphous resins. The amorphous resin may be linear or branched. crystalline polyester resin and amorphous resin, regardless if linear or branched, may be sulfonated. The crystalline polyester resin contains a sulfonation of less than about 3.0 mole % and the amorphous sulfonated polyester resin contains a sulfonation percentage greater than the sulfonation of the crystalline sulfonated polyester resin, more preferably the amorphous polyester resin contains a sulfonation between about 0.25 mole % and about 5.0 mole %. The weight ratio of the crystalline polyester resin to the amorphous resin present in the mixture is preferably from about 10:90 to about 50:50, more preferably from about 10:90 to about 30:70. Examples of crystalline polyester resins suitable for use herein include, for example, alkali sulfonated polyester resins. Specific crystalline resin examples include, but are not limited to, alkali copoly(5-sulfoisophthaloyl)-copoly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl)-copoly(propylene-succinate), alkali copoly(5-sulfoisophthaloyl)-copoly(butylenes-succinate), alkali copoly(5-sulfoisophthaloyl)-copoly(pentylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), poly(octylene-adipate), and wherein the alkali is a metal such as sodium, lithium or potassium. If semicrystalline polyester resins are employed herein, the semicrystalline resin includes, but is not limited to poly(3-methyl-1-butene), poly(hexamethylene carbonate), poly(ethylene-p-carboxy phenoxy-butyrate), poly(ethylene-vinyl acetate), poly(docosyl acrylate), poly(dodecyl acrylate), poly(octadecyl acrylate), poly(octadecyl methacrylate), poly(behenylpolyethoxyethyl methacrylate), poly(ethylene adipate), poly(decamethylene adipate), poly(decamethylene azelaate), poly(hexamethylene oxalate), poly(decamethylene oxalate), poly(ethylene oxide), poly(propylene oxide), poly(butadiene oxide), poly(decamethylene oxide), poly(decamethylene sulfide), poly(decamethylene disulfide), poly(ethylene sebacate), poly(decamethylene sebacate), poly(ethylene suberate), poly(decamethylene succinate), poly(eicosamethylene malonate), poly(ethylene-p-carboxy phenoxy-undecanoate), poly(ethylene dithionesophthalate), poly(methyl ethylene terephthalate), poly(ethylene-p-carboxy phenoxy-valerate), poly(hexamethylene-4,4'-oxydibenzoate), poly(10-hydroxy capric acid), poly(isophthalaldehyde), poly(octamethylene dodecanedioate), poly(dimethyl siloxane), poly(dipropyl siloxane), poly(tetramethylene phenylene diacetate), poly(tetramethylene trithiodicarboxylate), poly(trimethylene dodecane dioate), poly(m-xylene), and poly(p-xylylene pimelamide). The semicrystalline resins possess, for example, a suitable weight average molecular weight Mw, such as from about 7,000 to about 200,000, and more specifically from about 10,000 to about 150,000, a number average molecular weight Mn of, for example, from about 1,000 to about 60,000, and more specifically, from about 3,000 to about 50,000. The crystalline resin can possess various melting points of, for example, from about 30° C. to about 120° C., and preferably from about 50° C. to about 90° C., and, for example, a number average molecular weight (Mn), as measured by gel permeation chromatography (GPC) of, for example, from about 1,000 to about 50,000, and preferably from about 2,000 to about 25,000; with a weight average molecular weight (Mw) of the resin of, for example, from about 2,000 to about 100,000, and preferably from about 3,000 to about 80,000, as determined by GPC using polystyrene standards. The molecular weight distribution (Mw/Mn) of the crystalline resin is, for example, from about 2 to about 6, and more specifically, from about 2 to about 4. The linear and branched amorphous sulfonated resins, in embodiments, possess, for example, a number average molecular weight (Mn), as measured by GPC, of from about 10,000 to about 500,000, and preferably from about 5,000 to about 250,000; a weight average molecular weight (Mw) of, for example, from about 20,000 to about 600,000, and preferably from about 7,000 to about 300,000, as determined by GPC using polystyrene standards; and a molecular weight distribution (Mw/Mn) of, for example, from about 1.5 to about 6, and more specifically, from about 2 to about 4. The linear amorphous resins are generally prepared by the polycondensation of an organic diol and a diacid or diester, at least one of which is preferably a sulfonated or a sulfonated difunctional monomer being included in the reaction, and a polycondensation catalyst. For the branched amorphous sulfonated resin, the same materials may be used, with the further inclusion of a branching agent such as a multivalent polyacid or polyol.

In particular embodiments, polyolefins such as polypropylene, polyethylene, and copolymers thereof and blends thereof, as well as ethylene-propylene-diene terpolymers. In some embodiments, preferred olefinic polymers include homogeneous polymers described in U.S. Pat. No. 3,645,992 by Elston; high density polyethylene (HDPE) as described in U.S. Pat. No. 4,076,698 to Anderson; heterogeneously branched linear low density polyethylene (LLDPE); heterogeneously branched ultra low linear density (ULDPE); homogeneously branched, linear ethylene/alpha-olefin copolymers; homogeneously branched, substantially linear ethylene/alpha-olefin polymers which can be prepared, for example, by a process disclosed in U.S. Pat. Nos. 5,272,236 and 5,278,272, the disclosure of which process is incorporated herein by reference; and high pressure, free radical polymerized ethylene polymers and copolymers such as low density polyethylene (LDPE), ethylene-acrylic acid (EAA) and Ethylene-methacrylic acid copolymers such as for example those available under the tradenames Primacor™, Nucrel™, and Escor™ and described in U.S. Pat. Nos. 4,599, 392, 4,988,781, and 59384373, each of which is incorporated herein by reference in its entirety., and ethylene-vinyl acetate (EVA) copolymers. Polymer compositions described in U.S. Pat. Nos. 6,538,070, 6,566,446, 5,869,575, 6,448,341, 5,677,383, 6,316,549, 6,111,023, or 5,844,045, each of which is incorporated herein by reference in its entirety, are also suitable in some embodiments. Of course, blends of polymers can be used as well. In some embodiments the blends include two different Ziegler-Natta polymers. In other embodiments, the blends can include blends of a Ziegler-Natta and a metallocene polymer. In still other embodiments, the thermoplastic resin used herein is a blend of two different metallocene polymers.

In some particular embodiments, the thermoplastic resin is a propylene-based copolymer or interpolymer. In some embodiments the propylene/ethylene copolymer or interpolymer is characterized as having substantially isotactic propylene sequences The term "substantially isotactic propylene sequences" and similar terms mean that the sequences have an isotactic triad (mm) measured by 13C NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by $^{13}C$ NMR spectra. NMR spectra are determined as described below. Preferably, when the aqueous dispersions comprise a propylene/ethylene interpolymer, the ethylene is present in an amount of from about 5% to about 25% (by weight).

$^{13}C$ NMR spectroscopy is one of a number of techniques known in the art of measuring comonomer incorporation into a polymer and measuring isotactic triad levels in propylene-based copolymers. An example of this technique is described for the determination of comonomer content for ethylene/α-olefin copolymers in Randall (Journal of Macromolecular Science, Reviews in Macromolecular Chemistry and Physics, C29 (2 & 3), 201-317 (1989)). The basic procedure for determining the comonomer content of an olefin interpolymer involves obtaining the $^{13}C$ NMR spectrum under conditions where the intensity of the peaks corresponding to the different carbons in the sample is directly proportional to the total number of contributing nuclei in the sample. Methods for ensuring this proportionality are known in the art and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotopically labeled comonomer. The mole % comonomer can be determined by the ratio of the integrals corresponding to the number of moles of comonomer to the integrals corresponding to the number of moles of all of the monomers in the interpolymer, as described in Randall, for example.

The data is collected using a Varian UNITY Plus 400 MHz NMR spectrometer, corresponding to a $^{13}C$ resonance frequency of 100.4 MHz. Acquisition parameters are selected to ensure quantitative $^{13}C$ data acquisition in the presence of the relaxation agent. The data is acquired using gated 1H decoupling, 4000 transients per data file, a 7 sec pulse repetition delay, spectral width of 24,200 Hz and a file size of 32K data points, with the probe head heated to 130° C. The sample is prepared by adding approximately 3 mL of a 50/50 mixture of tetrachloroethane-d2/orthodichlorobenzene that is 0.025M in chromium acetylacetonate (relaxation agent) to 0.4 g sample in a 10 mm NMR tube. The headspace of the tube is purged of oxygen by displacement with pure nitrogen. The sample is dissolved and homogenized by heating the tube and its contents to 150° C. with periodic refluxing initiated by heat gun.

Preferably, the propylene/ethylene interpolymer has a crystallinity of less than about 50% and a flexural modulus, measured in accordance with ASTM D-790-97, of less than about 50 kpsi, preferably less than about 40 kpsi, and especially less than about 30 kpsi. Preferably, the propylene/ethylene interpolymer has a melting point of less than about 140° C., preferably less than about 130° C., more preferably less than about 120° C., especially less than about 90° C. The propylene/ethylene interpolymers used in the dispersions also preferably have a heat of fusion of less than 80 J/gm, more preferably less than about 75 J/gm, and can be as low as about 8 J/gm.

In some preferred dispersions, the propylene-based copolymer comprises a propylene-ethylene copolymer made using a nonmetallocene, metal-centered, heteroaryl ligand catalyst as described in U.S. patent application Ser. No. 10/139,786 filed May 5, 2002, which is incorporated by reference herein in its entirety for its teachings regarding such catalysts. The propylene-ethylene copolymers made with such nonmetallocene, metal-centered, heteroaryl ligand catalyst exhibit a unique regio-error. The regio-error is identified by $^{13}C$ NMR peaks corresponding at about 14.6 and about 15.7 ppm, which are believed to be the result of stereoselective 2,1-insertion errors of propylene units into the growing polymer chain. In this particularly preferred aspect, these peaks are of about equal intensity, and they typically represent about 0.02 to about 7 mole percent of the propylene insertions into the homopolymer or copolymer chain.

In some aspects of the invention, the propylene-based copolymer has a molecular weight distribution (MWD), defined as weight average molecular weight divided by number average molecular weight (Mw/Mn) of about 4 or less, and can be as low as about 1.5.

Molecular weight distribution of the polymers is determined using gel permeation chromatography (GPC) on a Polymer Laboratories PL-GPC-220 high temperature chromatographic unit equipped with four linear mixed bed columns (Polymer Laboratories (20-micron particle size)). The oven temperature is at 160° C. with the autosampler hot zone at 160° C. and the warm zone at 145° C. The solvent is 1,2,4-trichlorobenzene containing 200 ppm 2,6-di-t-butyl-4-methylphenol. The flow rate is 1.0 milliliter/minute and the injection size is 100 microliters. About 0.2% by weight solutions of the samples are prepared for injection by dissolving the sample in nitrogen purged 1,2,4-trichlorobenzene containing 200 ppm 2,6-di-t-butyl-4-methylphenol for 2.5 hrs at 160° C. with gentle mixing.

The molecular weight determination is deduced by using ten narrow molecular weight distribution polystyrene standards (from Polymer Laboratories, EasiCal PS1 ranging from 580-7,500,000 g/mole) in conjunction with their elution volumes. The equivalent propylene-ethylene copolymer molecular weights are determined by using appropriate Mark-Houwink coefficients for polypropylene (as described by Th.G. Scholte, N. L. J. Meijerink, H. M. Schoffeleers, and A. M. G. Brands, J. Appl. Polym. Sci., 29, 3763-3782 (1984)) and polystyrene (as described by E. P. Otocka, R. J. Roe, N.Y. Hellman, P. M. Muglia, Macromolecules, 4, 507 (1971)) in the Mark-Houwink equation:

$$\{N\} = KM^a$$

where $K_{pp}=1.90E-04$, $a_{pp}=0.725$ and $K_{ps}=1.26E-04$, $a_{ps}=0.702$.

In one embodiment of the invention, the thermoplastic resins utilized in the invention are characterized by a DSC curve with a Tme that remains essentially the same and a Tmax that decreases as the amount of unsaturated comonomer in the copolymer is increased. Tme means the temperature at which the melting ends and Tmax means the peak melting temperature, both as determined by one of ordinary skill in the art from DSC analysis using data from the final heating step. For such polymers, DSC analysis can be determined using a model Q1000 DSC from TA Instruments, Inc., which is calibrated using indium and deionized water.

In some other embodiments, thermoplastic polymer compositions disclosed in U.S. Pat. No. 6,525,157, incorporated by reference in its entirety. The polymers described therein comprise a majority of propylene with a minor amount of ethylene. These polymer compositions include a linear, single homogeneous macromolecular copolymer structure. These polymers have limited crystallinity due to adjacent isotactic propylene units and have a melting point as described below. They are generally devoid of any substantial intermolecular heterogeneity in tacticity and comonomer composition, and are substantially free of diene. They are also devoid of any substantial heterogeneity in intramolecular composition distribution.

In some embodiments of the dispersions described herein, the copolymer includes from a lower limit of 5% or 6% or 8% or 10% by weight ethylene-derived units to an upper limit of 20% or 25% by weight ethylene-derived units. These embodiments also will include propylene-derived units present in the copolymer in the range of from a lower limit of 75% or 80% by weight to an upper limit of 95% or 94% or 92% or 90% by weight. These percentages by weight are based on the total weight of the propylene and ethylene-derived units; i.e., based on the sum of weight percent propylene-derived units and weight percent ethylene-derived units being 100%. Within these ranges, these copolymers are mildly crystalline as measured by differential scanning calorimetry (DSC), and are exceptionally soft, while still retaining substantial tensile strength and elasticity. Elasticity, as defined in detail hereinbelow, is a dimensional recovery from elongation for these copolymers. At ethylene compositions lower than the above limits for the copolymer, such polymers are generally crystalline, similar to crystalline isotactic polypropylene, and while having excellent tensile strength, they do not have the favorable softness and elasticity. At ethylene compositions higher than the above limits for the copolymer component, the copolymer is substantially amorphous. While such a material of higher ethylene composition may be soft, these compositions are weak in tensile strength and poor in elasticity. In summary, such copolymers of embodiments of our invention exhibit the softness, tensile strength and elasticity characteristic of vulcanized rubbers, without vulcanization.

Propylene and ethylene are the monomers that can be used to make the copolymers of embodiments of our invention, but optionally, ethylene can be replaced or added to in such polymers with a $C_4$ to $C_{20}$ alpha-olefin, such as, for example, 1-butene, 4-methyl-1-pentene, 1-hexene or 1-octene.

In some embodiments of the present invention the copolymers are substantially free of diene-derived units. Dienes are nonconjugated diolefins which may be incorporated in polymers to facilitate chemical crosslinking reactions. "Substantially free of diene" is defined to be less than 1% diene, or less than 0.5% diene, or less than 0.1% diene, or less than 0.05% diene, or equal to 0%. All of these percentages are by weight in the copolymer. The presence or absence of diene can be conventionally determined by infrared techniques well known to those skilled in the art.

Sources of diene include diene monomer added to the polymerization of ethylene and propylene, or use of diene in catalysts. No matter the source of such dienes, the above outlined limits on their inclusion in the copolymer are contemplated. Conjugated diene-containing metallocene catalysts have been suggested for the formation of copolymers of olefins. However, polymers made from such catalysts will incorporate the diene from the catalyst, consistent with the incorporation of other monomers in the polymerization.

In embodiments of our invention, a thermoplastic resin is included having a weight average molecular weight (Mw) of from 15,000-5,000,000, or from 20,000 to 1,000,000 and a molecular weight distribution Mw/Mn (sometimes referred to as a "polydispersity index" (PDI)) ranging from a lower limit of 1.01, 1.5 or 1.8 to an upper limit of 40 or 20 or 10 or 5 or 3.

In the measurement of properties ascribed to some propylene-rich polymers of some dispersions, there is a substantial absence of a secondary or tertiary polymer or polymers to form a blend. By "substantial absence" we intend less than 10%, or less than 5%, or less than 2.5%, or less than 1%, or 0%, by weight.

Another measure of molecular weight typically used for polyethylene polymers is the melt index of the polymer, also called $I_2$. The melt index is indirectly proportional to the molecular weight, although the relationship is not linear. For polyethylene the melt index is measured according to ASTM D-1238, condition 190 deg C./2.16 kg). Typical thermoplastic resins useful in embodiments of the invention have an $I_2$ in the range of from 0.001 to 1000 g/10 min. In some embodiments, the thermoplastic resin (A) has an $I_2$ of from 0.5 to 500 g/10 min. Other embodiments include a thermoplastic resin with an $I_2$ of from 1 to 300 g/10 min. The selection of suitable $I_2$ for the thermoplastic resin should be selected in view of the ease of melt kneadability and physical properties of the coating formed.

Melt flow rate (MFR) is another way of measuring the molecular weight of polypropylene polymers. Like melt index, MFR is indirectly proportional to the molecular weight, although the relationship is not linear. MFR is typically measured according to ASTM D-1238, condition 230° deg C./2.16 kg). Typical thermoplastic resins useful in embodiments of the invention have an MFR less than about 250 g/10 min. In some embodiments, the thermoplastic resin (A) has an MFR of from about 1 to about 200 g/10 min. Other embodiments include a thermoplastic resin with an MFR of from 5 to 100 g/10 min Melting Point and Crystallinity Differential scanning calorimetry (DSC) is a common technique that can be used to examine the melting and crystallization of semi-crystalline polymers. General principles of DSC measurements and applications of DSC to studying semi-crystalline polymers are described in standard texts (e.g., E. A. Turi, ed., Thermal Characterization of Polymeric Materials, Academic Press, 1981). For example, DSC analysis may be determined using a model Q1000 DSC from TA Instruments, Inc, which is calibrated using indium and deionized water. After heating the sample rapidly to 230 C and holding for 3 minutes, the cooling curve is obtained by cooling at 10 C/min to –40 C. After holding at –40 C for 3 minutes, the DSC melting endotherm is recorded while heating at 10 C/min. The melting point is determined using the standard TA DSC software.

These propylene-rich polymers can be made by a number of processes, such as by single stage, steady state, polymerization conducted in a well-mixed continuous feed polymerization reactor. In addition to solution polymerization, other polymerization procedures such as gas phase or slurry polymerization may be used. Other details suitable processes for preparing such polymers are described in U.S. Pat. No. 6,525,157, incorporated by reference in its entirety.

A typical isotactic polymerization process consists of a polymerization in the presence of a catalyst including a bis (cyclopentadienyl) metal compound and either (1) a non-coordinating compatible anion activator, or (2) an alumoxane activator. According to one embodiment of the invention, this process comprises the steps of contacting ethylene and propylene with a catalyst in a suitable polymerization diluent, the catalyst including, in one embodiment, a chiral metallocene compound, e.g., a bis(cyclopentadienyl) metal compound as described in U.S. Pat. No. 5,198,401, and an activator. U.S. Pat. No. 5,391,629 also describes catalysts useful to produce the some copolymers suitable in dispersions described herein. Gas phase polymerization processes are described in U.S. Pat. Nos. 4,543,399, 4,588,790, 5,028,670, for example. Methods of supporting metallocene catalysts useful for making some copolymers used embodiments of the invention are described in U.S. Pat. Nos. 4,808,561, 4,897,455, 4,937,301, 4,937,217, 4,912,075, 5,008,228, 5,086,025, 5,147,949, and 5,238,892. Numerous examples of the biscyclopentadienyl metallocenes described above for the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614. Descriptions of ionic catalysts for coordination polymerization including metallocene cations activated by non-coordinating anions appear in the early work in EP-A-0 277 003, EP-A-0 277 004, U.S. Pat. Nos. 5,198,401 and 5,278,119, and WO 92/00333. The use of ionizing ionic compounds not containing an active proton but capable of producing both the active metallocene cation and a non-coordinating anion is also known. See, EP-A-0 426 637, EP-A-0 573 403 and U.S. Pat. No. 5,387,568, EP-A-0 427 697 and EP-A-0 520 732. Ionic catalysts for addition polymerization can also be prepared by oxidation of the metal centers of transition metal compounds by anionic precursors containing metallic oxidizing groups along with the anion groups; see EP-A-0 495 375.

Some polymers can be prepared by a polymerization process comprising: reacting propylene and at least one comonomer selected from the group consisting of ethylene and at least one $C_4$ to $C_{20}$ alpha-olefin, under polymerization conditions in the presence of a metallocene catalyst capable of incorporating the propylene sequences into isotactic or syndiotactic orientations, in at least one reactor to produce a first copolymer having at least 65 mole % propylene and wherein preferably at least 40% of the propylene sequences are in isotactic or syndiotactic orientations; wherein the copolymer has a melt index (MI) from about 7 dg/min to about 3000 dg/min. Some details of the polymers are described in the following paragraphs.

Preferably, the propylene-rich polymer or polymer blend has a melting point of from 60 to 120° C., more preferably from 80 to 100° C. Also, the polymer or polymer blend preferably includes ethylene (or an alpha olefin, e.g., having from 4-20 carbon atoms) in the amount of up to 30 mole %, preferably from 3 mole % to 20 mole % and more preferably from 7 mole % to 15 mole wt %. In this context, the ethylene or alpha olefin can be units forming part of a random semic-rystalline copolymer that includes both propylene units and ethylene units, e.g., when a single copolymer is used (not a blend). Alternatively, a blend can be used in which isotactic polypropylene is blended with a polyethylene, in which case the ethylene units in the polyethylene should be up to 30 mole % of the overall polymer blend. As discussed in greater detail below, it is contemplated that while the presence of ethylene units may provide the desired melting point, those same ethylene units may cause crosslinking to such an extent that the MFR is decreased rather than increased, and for that reason, the amount of ethylene should be limited.

In other specific embodiments, the dispersions include a propylene-rich polymer or polymer blends wherein the composition preferably includes a random copolymer produced by copolymerizing propylene and at least one of ethylene or alpha-olefin having 20 or less carbon atoms, preferably 8 or less carbon atoms, the random copolymer having a crystallinity at least about 2% and no greater than about 65% derived from stereoregular polypropylene sequences and a melting point of from about 25° C. to about 105° C.

In still other specific embodiments, the propylene-rich copolymers are the reaction product of a free radical initiator and a random copolymer produced by copolymerizing propylene and at least one of ethylene or alpha-olefin having 8 or less carbon atoms, the random copolymer having a crystallinity at least about 2% and no greater than about 65% derived from stereoregular polypropylene sequences and a melting point of from about 25° C. to about 105° C.

In yet another specific embodiment of this invention the dispersion includes a random polymer with a melting point between about 60° C. and 140° C., more preferably between 80° C. and 110° C. The viscosity as measured by melt flow rate at 230° C. should be between 2 and 5600, more preferably between 70 and 370, and most preferably between 300 and 1800. Correspondingly, the melt index, measured at 190° C., should be between 20 and 1500, more preferably between 40 and 1000, and most preferably between 100 and 500. Further, the tensile elongation of the polymer at room temperature should be in excess of 50%, more preferably in excess of 100%, and most preferably in excess of 300%. Preferably, the random copolymer is a low molecular weight copolymer containing propylene units in an amount of 80% or above, preferably more than 90%, with the propylene units preferably being predominantly isotactic sequences (more than 80% of the units being isotactic pentads), as measured by $^{13}$C NMR. The random copolymers can have long chain branching, providing greater flexibility for desired rheological properties.

Still other dispersions can include a polyolefin composition containing a physical blend, wherein an ethylene-propylene copolymer is blended together with isotactic polypropylene. Those ethylene-propylene copolymers are preferably derived by solution polymerization using chiral metallocene catalysts. Those ethylene-propylene copolymers preferably have crystallinity derived from isotactic propylene sequences. In those blend compositions, the composition of the copolymers includes up to 30 wt % and preferably up to 20 wt % ethylene. Those copolymers may be linear or branched. Those blends preferably contain substantial amounts of isotactic polypropylene, at least about 5 to 10 wt %. In a specific embodiment, the blend can include isotactic polypropylene in an amount up to about 50 wt %, or alternatively up to about 80 wt %. The blend can also include other olefin-based polymers, such as reactor copolymers and impact copolymers. Desirably, the use of the blends described above provide for favorable melting temperatures due to the presence of the isotactic polypropylene while providing a separate molecular architecture for the copolymer, thus improving the rheology, elasticity and flexibility of the adhesive composition.

In still other embodiments, some dispersions include a thermoplastic resin selected from copolymers and interpolymers of ethylene and/or propylene and other monomers selected from $C_4$ to $C_{10}$ olefins, preferably alpha-olefins, more preferably from $C_4$ to $C_8$ alpha-olefins and most preferably selected from n-butene, n-hexene and n-octene. The ethylene or propylene content of the thermoplastic resin ranges from about 2-98 wt. percent of the resin.

In some embodiments, a primarily ethylene-based polyolefin is selected in which ethylene comprises from about 98 to 65 percent of polymer. In other embodiments, a primarily propylene-based polyolefin may be selected, propylene comprising from about 98 to 65 percent of the Polymer. Selected comonomer(s) make up the remainder of the polymer.

In some such embodiments, the ethylene polymer has the following characteristics and properties: 1) Crystallinity as determined by the observance of at least one endotherm when subjected to standard differential scanning calorimetry (DSC) evaluation; 2) a melt index of between about 30 and about 0.1 g/10 min, preferably of between 25 and 0.25 g/10 min, more preferably of between 22 and 0.5 g/10 min and most preferably of between 18 and 0.75 g/10 min; and 3) a density as determined according to ASTM D-792 of between about 0.845 and about 0.925 g/cc, preferably between 0.85 and 0.91 g/cc, and more preferably between 0.855 and 0.905 g/cc, and most preferably between 0.86 and 0.90 g/cc.

One class of resins particularly suited to use in embodiments of the invention are copolymers of ethylene and 1-octene or 1-butene, where ethylene comprises from about 90 to about 50, more preferably 85 to 55, and 1-octene or 1-butene from about 10 to about 50, more preferably about 15 to 45 percent by weight of the copolymer, and that have Melt Index of between about 0.25 and about 30, more preferably between 0.5 and 20 g/10 min. Alternatively, instead of a single Polymer a blend of polymers may be employed that has the physical characteristics described above. For example, it may be desirable to blend a first polymer with relatively high MI that is outside the range described above, with another of relatively low MI, so that the combined MI and the averaged density of the blend fall within the ranges noted above.

In addition to the thermoplastic resin, dispersions described herein include a dispersing agent. Any dispersing agent may be used in embodiments of the invention. As used herein the term "dispersing agent" means an agent that aids in the formation and/or the stabilization of a dispersion. Some dispersing agents can also be used to form emulsions and are described in detail by Paul Becher (Emulsions: Theory and Practice, 3rd edition, Oxford University Press, New York, 2001), incorporated herein by reference in its entirety. Dispersing agents generally fall into three classes 1) surface-active materials, 2) naturally occurring materials, 3) finely divided solids. Surface-active agents, also called surfactants, are materials that reduce the interfacial tension between two immiscible liquid phases. They are classified according to the hydrophilic group in the molecule: anionic, cationic, nonionic, or ampholytic (amphoteric). Examples of commercially available dispersing agents is found in McCutcheon (McCutcheon's Emulsifiers and Detergents, Glen Rock, N.J., issued annually). Examples of naturally occurring materials include phospholipids, sterols, lanolin, water-soluble gums, alginates, carageenin, and cellulose derivatives. Examples of finely divided solids include basic salts of the metals, carbon black, powdered silica, and various clay (principally bentonite).

In some embodiments, a carboxylic acid or carboxylic acid salt is used as the dispersing agent. Typical salts include an alkali metal salt or an alkaline earth metal salts of the fatty acid. Other salts include ammonium or alkyl ammonium salts of the carboxylic acid. In some embodiments, the carboxylic acid or it's salt with 12 to fewer than 25 carbon atoms. Where the dispersing agent is a salt, the number of carbons refers to the carbon atoms associated with the carboxylic acid fragment. In other embodiments, the salt is formed with a fatty acid fragment that has at from 15 to 25 carbon atoms. Particular embodiments use an alkali metal salt of erucic acid. Erucic acid is a carboxylic acid with 22 carbon atoms. Some embodiments use erucic acid in the form of rapeseed oil which is a natural oil that contains approximately 40 to about 50% erucic acid with the remainder consisting of primarily chains having 18 carbon atoms. An alkali metal salt of erucic acid is also useful in some embodiments.

Some embodiments of the present invention use a fatty acid or its salt that is derived from an ester of a fatty acid. The alcohol residue constituting such ester may preferably contain 2 to 30 carbon atoms, and most preferably 6 to 20 carbon atoms. Such residue may be either a straight or a branched residue, and may also be a mixture of two or more residues each containing different number of carbon atoms. Exemplary such alcohol residues include residues of higher alcohols containing 10 to 20 carbon atoms such as cetyl alcohol, stearyl alcohol, and oleyl alcohol. Some embodiments use an ester wax of erucic acid.

In particular embodiments the salt of a fatty acid containing fewer than 25 carbon atoms is produced by neutralizing a fatty acid containing fewer than 25 carbon atoms or by saponification of an ester of a fatty acid containing fewer than 25 carbon atoms.

In other embodiments, the dispersing agent can be an ethylene acrylic acid copolymer. Still other embodiments use alkyl ether carboxylates as the dispersing agent. In some embodiments, petroleum sulfonates are useful. In other embodiments, the dispersing agent is a sulfonated or polyoxyethylenated alcohol. In still other embodiments, sulfated or phosphated polyoxyethylenated alcohols are suitable. Polymeric ethylene oxide/propylene oxide/ethylene oxide dispersing agents, known as poloxamers are used as the dispersing agent. Primary and secondary alcohol ethoxylates are also suitable in some dispersions. Alkyl glycosides and alkyl glycerides are used in some dispersions. Of course, combinations of these dispersing agents are also suitable.

Embodiments of the aqueous dispersions described herein contain water in addition to the components as described above. Deionized water is typically preferred. In some embodiments, water with excess hardness can undesirably affect the formation of a suitable dispersion. Particularly water containing high levels of alkaline earth ions, such as $Ca^{2+}$, should be avoided. The term "dispersion" as used herein refers to a finely divided solid or liquid in a continuous liquid medium. An aqueous dispersion is a dispersion in which the continuous liquid medium is water. The term "dispersion" as used herein in connection with the compositions of the invention is intended to include within its scope both emulsions of essentially liquid materials, prepared employing the thermoplastic resin and the dispersing agent, and dispersions of solid particles. Such solid dispersions can be obtained, for example, by preparing an emulsion as previously described, and then causing the emulsion particle to solidify by various means. Thus, when the components are combined, some embodiments provide an aqueous dispersion wherein content of the dispersing agent is present in the range of from 0.5 to 30 parts by weight, and content of (C) water is in the range of 1 to 35% by weight per 100 parts by weight of the thermoplastic polymer; and total content of (A) and (B) is in the range of from 65 to 99% by weight. In particular embodiments, the dispersing agent ranges from 2 to 20 parts by weight based on 100 parts by weight of the polymer. In some embodiments, the amount of dispersing agent is less than about 4 percent by wt., based on the weight of the thermoplastic polymer. In some embodiments, the dispersing agent comprises from about 0.5 percent by wt. to about 3 percent by weight, based on the amount of the thermoplastic polymer used. In other embodiments, about 1.0 to about 3.0 weight percent of the dispersing agent are used. Embodiments having less than about 4 weight percent dispersing agent are preferred where the dispersing agent is a carboxylic acid.

One feature of some embodiments of the invention is that the dispersions have a small particle size. Typically the average particle size is less than about 5 μm. Some preferred dispersions have an average particle size of less than about 1.5 μm. In some embodiments, the upper limit on the average particle size is about 4.5 μm, 4.0 μm, 3.5 μm, 3.75 μm, 3.5 μm, 3.0 μm, 2.5 μm, 2.0 μm, 1.5 μm, 1.0 μm, 0.5 μm, or 0.1 μm. Some embodiments have a lower limit on the average particle size of about 0.05, 0.7 μm, 0.1 μm, 0.5 μm, 1.0 μm, 1.5 μm, 2.0 μm, or 2.5 μm. Thus, some particular embodiments have, for example, an average particle size of from about 0.05 μm to about 1.5 μm. While in other embodiments, the particles in the dispersion have an average particle size of from about 0.5 μm to about 1.5 μm. For particles that are not spherical the diameter of the particle is the average of the long and short axes of the particle. Particle sizes can be measured on a Coulter LS230 light-scattering particle size analyzer or other suitable device.

Another parameter that characterizes particles in the dispersions is the particle size distribution, defined herein as the volume average particle diameter (Dv) divided by number average particle diameter (Dn). Some embodiments are characterized by a particle size distribution of less than or equal to about 2.0. In other embodiments, the dispersions have a particle size distribution of less than or equal to about less than 1.9, 1.7, or 1.5.

In yet another particular embodiment the aqueous dispersion has a concentration of the solid content including (A) thermoplastic resin is in the range of from 10 to 70%. Another measure of solids content is by volume. In some embodiments, the dispersion has a percent solids of less than about 74% by volume. Other dispersions have a solids content of from about 5% to about 74% by volume. In some embodiments, the dispersions have a percent solids of less than about 70% by volume, less than about 65% by volume, or ranging from about 5% to about 50% by volume.

One feature of some of the dispersions described herein is the pH, which can affect the uses for which dispersions are suitable. Typically, the dispersions have a pH of less than 12. Preferably, the pH ranges from about 5 to about 11.5, preferably from about 7 to about 11., more preferably from about 9 to about 11. However, dispersions having a lower limit of the pH of about 5, about 6, about 7, about 8, about 9, about 10, or about 11 are contemplated. Dispersions having an upper limit on the pH of about 6, about 7, about 8, about 9, about 10, about 11, or about 12 are contemplated.

While any method may be used, one convenience way to prepare the dispersions described herein is by melt-kneading. Any melt kneading means known in the art may be used. In some embodiments a kneader, a Banbury mixer, single-screw extruder, or a multi-screw extruder is used. The melt kneading may be conducted under the conditions which are typically used for melt kneading the thermoplastic resin (A). A process for producing the dispersions in accordance with the present invention is not particularly limited. One preferred process, for example, is a process comprises melt-kneading the above-mentioned components according to U.S. Pat. No. 5,756,659 and U.S. patent application No. 20010011118. A preferred melt-kneading machine is, for example, a multi screw extruder having two or more screws, to which a kneading block can be added at any position of the screws. If desired, it is allowable that the extruder is provided with a first material-supplying inlet and a second material-supplying inlet, and further third and forth material-supplying inlets in this order from the upper stream to the down stream along the flow direction of a material to be kneaded. Further, if desired, a vacuum vent may be added at an optional position of the extruder. In some embodiments, the dispersion is first diluted to contain about 1 to about 3% by weight of water and then subsequently further diluted to comprise greater than 25% by weight of water. In some embodiments, the further dilution provides a dispersion with at least about 30% by weight of water. The aqueous dispersion obtained by the melt kneading may be further supplemented with an aqueous dispersion of an ethylene-vinyl compound copolymer, or a dispersing agent.

FIG. 1 schematically illustrates such an extrusion apparatus embodiments of the invention. An extruder, in certain embodiments a twin screw extruder, 20 is coupled to a back pressure regulator, melt pump, or gear pump, 30. Embodiments also provide a base reservoir, 40 and an initial water reservoir 50, each of which includes a pump (not shown). Desired amounts of base and initial water are provided from the base reservoir 40 and the initial water reservoir 50, respectively. Any suitable pump may be used, but in some embodiments a pump that provides a flow of about 150 cc/min at a pressure of 240 bar is used to provide the base and the initial water to the extruder 20. In other embodiments, a liquid injection pump provides a flow of 300 cc/min at 200 bar or 600 cc/min at 133 bar. In some embodiments the base and initial water are preheated in a preheater.

Resin in the form of pellets, powder or flakes is fed from the feeder 80 to an inlet 90 of the extruder 20 where the resin is melted or compounded. In some embodiments, the dispersing agent is added to the resin through an along with the resin and in other embodiments, the dispersing agent is provided separately to the twin screw extruder 20. The resin melt is then delivered to from the mix and convey zone to an emulsification zone of the extruder where the initial amount of water and base from the reservoirs 40 and 50 is added through inlet 55. In some embodiments, dispersing agent may be added additionally or exclusively to the water stream. In some embodiments, the emulsified mixture is further diluted with additional water inlet 95 from reservoir 60 in a dilution and cooling zone of the extruder 20. Typically, the dispersion is diluted to at least 30 weight percent water in the cooling zone. In addition, the diluted mixture may be diluted any number of times until the desired dilution level is achieved. In some embodiments, water is not added into the twin screw extruder 20 but rather to a stream containing the resin melt after the melt has exited from the extruder. In this manner, steam pressure build-up in the extruder 20 is eliminated.

In some embodiments a basic substance or aqueous solution, dispersion or slurry thereof is added to the dispersion at any point of the process, preferably to the extruder. Typically the basic substance is added as an aqueous solution. But in some embodiments, it is added in other convenient forms, such as pellets or granules. In some embodiments, the basic substance and water are added through separate inlets of the extruder. Examples of the basic substance which may be used for the neutralization or the saponification in the melt kneading process include alkaline metals and alkaline earth metals such as sodium, potassium, calcium, strontium, barium; inorganic amines such as hydroxylamine or hydrazine; organic amines such as methylamine, ethylamine, ethanolamine, cyclohexylamine, tetramethylammonium hydroxide; oxide, hydroxide, and hydride of alkaline metals and alkaline earth metals such as sodium oxide, sodium peroxide, potassium oxide, potassium peroxide, calcium oxide, strontium oxide, barium oxide, sodium hydroxide, potassium hydroxide, calcium hydroxide, strontium hydride, barium hydroxide, sodium hydride, potassium hydride, calcium hydride; and weak acid salts of alkaline metals and alkaline earth metals such as sodium carbonate, potassium carbonate, sodium hydrogencarbonate, potassium hydrogencarbonate, calcium hydrogencarbonate, sodium acetate, potassium acetate, calcium acetate; or ammonium hydroxide. In particular embodiments, the basic substance is a hydroxide of an alkaline metal or a hydroxide of an alkali metal. In some embodiments, the basic substance is selected from potassium hydroxide, sodium hydroxide and combinations thereof.

The aqueous dispersion may be coated onto a substrate by various procedures, and for example, by spray coating, curtain flow coating, coating with a roll coater or a gravure coater, brush coating, dipping. The coating is preferably dried by heating the coated substrate to 50 to 150° C. for 1 to 300 seconds although the drying may be accomplished by any suitable means.

The substrate for coatings may comprise a film of a thermoplastic resin such as polyethylene terephthalate, polyethylene, polycarbonate, polyimide, polyamide, polyphenylene sulfide, polysulfone, aromatic polyester, polyether ether ketone, polyether sulfone, and polyether imide. The preferred is the film comprising polyethylene terephthalate, polyethylene, polyamide, and polycarbonate, and the most preferred is the film comprising polyethylene terephthalate. Typically the films have a thickness in the range of from 0.5 to 50 microns, although some have a thickness of from 1 to 30 microns.

Some embodiments of the dispersions described herein are capable of forming a coating which exhibits excellent water resistance, oil resistance, or chemical resistance. Some embodiments exhibit adhesion to non-polar materials, and therefore, when the aqueous dispersion of the present invention is coated and dried on the surface of a substrate such as paper, fiber, wood, metal, or plastic molded article, the resulting resin coating will provide the substrate with water resistance, oil resistance, chemical resistance, corrosion resistance and heat sealability. Coatings obtained from some dispersions described herein exhibit excellent moisture resistance, water repellency, thermal adhesion to paper, especially for water and/or grease barrier and ink adhesion coatings layers, metal, glass, wood, fiber (natural fiber and synthetic fiber), and nonwoven fabric, thermal transfer properties, abrasion resistance, impact resistance, weatherability, solvent resistance, flexibility, and adaptability to high-frequency fabricating. Some dispersions are particularly suited for the formation of textile coatings including fabric impregnation. Some dispersions are also suitable for use as carpet backing layers. Coatings for architectural works are also contemplated as well as coatings for controlled release coatings on fertilizer pellets or as coatings to control surface properties such as coefficient of friction. Additionally some dispersions can be used to prepare stable froths and foams, as described in "Froths and Durable Foams of Dispersed Olefin Polymers and articles Prepared from Same" filed concurrently herewith.

Some aqueous dispersions described herein are used as a binder in a coating composition for a coated wall paper; a fiber coating agent (for improving the strength, moisture adsorption, or water repellency of the fiber); a net for construction, a sizing agent for nylon, polyester or glass fibers; a sizing agent/thermal adhesive of a paper or a nonwoven fabric; and an agent for imparting heat sealability with a paper or a film; a thermal adhesive of a sterilized paper; a binder of an ink or a coating composition; a surface coating agent for a paper or a film adapted for use with an ink jet printer; an agent for improving chipping resistance of an automotive coating composition; and the like.

In some embodiments, the aqueous dispersions have additional components in an amount that does not adversely affect the object of the present invention. Exemplary such additional components include water-soluble amino resins such as water-soluble melamine resin and water-soluble benzoguanamine resin and water-soluble epoxy resins for improving coating performance; organic thickeners such as polyvinyl alcohol, polyvinyl pyrrolidone, polyvinyl methylether, polyethylene oxide, polyacrylamide, polyacrylic acid, carboxy methyl cellulose, methyl cellulose, and hydroxyethyl cellulose and inorganic thickeners such as silicon dioxide, active clay, and bentonite for improving the stability and adjusting the viscosity of the dispersion; dispersing agents such as nonionic dispersing agents and anionic dispersing agents and water-soluble polyvalent metal salts for improving the stability of the dispersion; other additives such as anti-rust agent, anti-mold agent, UV absorber, thermal stabilizer, foaming agent, antifoaming agent, and the like; pigments such as titanium white, red iron oxide, phthalocyanine, carbon black, permanent yellow; and fillers such as calcium carbonate, magnesium carbonate, barium carbonate, talk, aluminum hydroxide, calcium sulfate, kaolin, mica, asbestos, mica, and calcium silicate.

EXAMPLES

Example 1

100 parts by weight of a thermoplastic ethylene-vinyl acetate commercially available from DuPont having a vinyl acetate content of about 28 wt %, a density of about 0.95 g/cm3 (ASTM D-792) and a melt index of about 6 g/10 min. (as determined according to ASTM D1238 at 190° C. and 2.16 kg), and a melting point of about 73° C. (as determined according to ASTM D3417.) and 4.2 parts by weight of a $C_{32}$ carboxylic acid (Unicid 425 manufactured by Baker-Petrolite, acid value 97 mg KOH/g) are melt kneaded at 180° C. in twin screw extruder at a rate of 8.3 kg/hr.

Upon the melt kneaded resin/surfactant, 4.6 wt % aqueous solution of potassium hydroxide is continuously fed into a downstream injection port at a rate 0.9 kg/hr (at a rate of 10 wt % of the total mixture). This aqueous dispersion is subsequently diluted with additional water at a rate of 5.7 kg/hr before exiting the extruder. An aqueous dispersion having a solids content of 56 wt % at pH 10.7 is obtained. The dispersed polymer phase measured by a Coulter LS230 particle analyzer consisted of an average volume diameter of 0.56 micron and a particle size distribution (dv/dn) of 1.45.

Example 2

100 parts by weight of a thermoplastic ethylene/1-octene copolymer with an octene content of about 38 wt %, a density of about 0.87 g/cm3 (ASTM D-792) and a melt index of about 5 g/10 min. (as determined according to ASTM D1238 at 190° C. and 2.16 kg) a Mw/Mn of about 2.0, and a melting point of about 63° C. (as determined by DSC at a scanning rate of about 10° C. per minute), commercially available from DuPont Dow Elastomers, and 3.1 parts by weight of a C18/C16 carboxylic acid (Industrene 106 manufactured by CK Witco, acid value 200 mg KOH/g) are melt kneaded at 125° C. in twin screw extruder at a rate of 7.9 kg/hr.

Upon the melt kneaded resin/surfactant, 23.9 wt % aqueous solution of potassium hydroxide is continuously fed into a downstream injection port at a rate 0.2 kg/hr (at a rate of 2.5 wt % of the total mixture). This aqueous dispersion is subsequently diluted with additional water at a rate of 5.4 kg/hr before exiting the extruder. To further dilute the resulting dispersion, additional water is added at a rate of 0.7 kg/hr after the mixture exited the extruder. An aqueous dispersion having a solids content of 56 wt % at pH 9.6 is obtained. The dispersed polymer phase measured by a Coulter LS230 particle analyzer consisted of an average volume diameter of 2.04 micron and a particle size distribution (dv/dn) of 1.18.

Example 3

100 parts by weight of a thermoplastic ethylene/1-octene copolymer with octene content of about 38 wt %, a density of about 0.87 g/cm3 (ASTM D-792) and a melt index of about 5 g/10 min. (as determined according to ASTM D1238 at 190° C. and 2.16 kg) a Mw/Mn of about 2.0, and a melting point of about 63° C. (as determined by DSC at a scanning rate of about 10° C. per minute.), commercially available from DuPont Dow Elastomers, and 3.6 parts by weight of a C22/C18 carboxylic acid (High-erucic rapeseed oil manufactured by Montana Specialty Mills, acid value 97 mg KOH/g) are melt kneaded at 150° C. in twin screw extruder at a rate of 5.0 kg/hr.

Upon the melt kneaded resin/surfactant, 16.3 wt % aqueous solution of potassium hydroxide is continuously fed into a downstream injection port at a rate 0.1 kg/hr (at a rate of 2.0 wt % of the total mixture). This aqueous dispersion is subsequently diluted with additional water at a rate of 3.2 kg/hr before exiting the extruder. To further dilute the resulting dispersion, additional water is added at a rate of 0.8 kg/hr after the mixture exited the extruder. An aqueous dispersion having a solids content of 55 wt % at pH 10.7 is obtained. The dispersed polymer phase measured by a Coulter LS230 particle analyzer consisted of an average volume diameter of 1.11 micron and a particle size distribution (dv/dn) of 1.85.

Example 4

100 parts by weight of a thermoplastic ethylene/1-octene copolymer with octene content of about 38 wt %, a density of about 0.87 g/cm3 (ASTM D-792) and a melt index of about 5 g/10 min. (as determined according to ASTM D1238 at 190° C. and 2.16 kg) a Mw/Mn of about 2.0, and a melting point of about 63° C. (as determined by DSC at a scanning rate of about 10° C. per minute.), commercially available from DuPont Dow Elastomers and 3.1 parts by weight of a C26 carboxylic acid (Unicid 350 manufactured by Baker-Petrolite, acid value 115 mg KOH/g) are melt kneaded at 150° C. in twin screw extruder at a rate of 9.7 kg/hr.

Upon the melt kneaded resin/surfactant, 12.5 wt % aqueous solution of potassium hydroxide is continuously fed into a downstream injection port at a rate 0.2 kg/hr (at a rate of 2.0 wt % of the total mixture). This aqueous dispersion is subsequently diluted with additional water at a rate of 7.5 kg/hr before exiting the extruder. An aqueous dispersion having a solids content of 56 wt % at pH 10.8 is obtained. The dispersed polymer phase measured by a Coulter LS230 particle analyzer consisted of an average volume diameter of 0.79 micron and a particle size distribution (dv/dn) of 1.95.

Example 5

100 parts by weight of a thermoplastic propylene-ethylene copolymer with an ethylene content of about 12.7 wt %, a density of about 0.864 g/cm3 (ASTM D-792) and a melt flow rate of about 23 g/10 min. (as determined according to ASTM D1238 at 230° C. and 2.16 kg), a melting point of 60-70° C., a Mw/Mn of about 2.0, and a flexural modulus of about 4 kpsi and commercially available from Dow Chemical, and 6.4 parts by weight of a C26 carboxylic acid (Unicid 350 manufactured by Baker-Petrolite, acid value 115 mg KOH/g) are melt kneaded at 150° C. in twin screw extruder at a rate of 1.6 kg/hr.

Upon the melt kneaded resin/surfactant, 25 wt. % aqueous solution of potassium hydroxide is continuously fed into a downstream injection port at a rate 0.08 kg/hr (at a rate of 4.8 wt % of the total mixture). This aqueous dispersion is subsequently diluted with additional water at a rate of 1.5 kg/hr before exiting the extruder. An aqueous dispersion having a solids content of 51 wt % at pH 11.6 is obtained. The dispersed polymer phase measured by a Coulter LS230 particle analyzer consisted of an average volume diameter of 0.61 micron and a particle size distribution (dv/dn) of 1.31.

Example 6

100 parts by weight of a thermoplastic propylene-ethylene copolymer with comonomer content of about 9 wt %, a melting point of 86° C., a melt flow rate of about 25 g/10 min (as determined according to ASTM D1238 at 230° C. and 2.16 kg), and a Mw/Mn of about 2.0, commercially available from Dow Chemical, and 42.9 parts by weight of an ethylene acrylic acid copolymer, available from the Dow Chemical Company under the tradename Primacor™ 5980i, with a melt index of about 15 g/10 min determined according to ASTM D1238 at 125° C./2.16 kg (which is equivalent to about 300 g/10 min when determined according to ASTM D1238 at 190° C./2.16 kg), an acrylic acid content of about 20.5 wt. %, and a DSC melting point of about 77° C. are melt kneaded at 170° C. in twin screw extruder at a rate of 4.3 kg/hr.

Upon the melt kneaded resin/surfactant, 11.7 wt. % aqueous solution of potassium hydroxide is continuously fed into a downstream injection port at a rate 1.6 kg/hr (at a rate of 27.1 wt % of the total mixture). This aqueous dispersion is subsequently diluted with additional water at a rate of 2.7 kg/hr before exiting the extruder. To further dilute the resulting dispersion, additional water is added at a rate of 2.3 kg/hr after the mixture exited the extruder. An aqueous dispersion having a solids content of 41 wt % at pH 9.9 is obtained. The dispersed polymer phase measured by a Coulter LS230 particle analyzer consisted of an average volume diameter of 0.86 micron and a particle size distribution (dv/dn) of 1.48.

As demonstrated above, embodiments of the invention provide new dispersions useful for many applications. In some instances, the new have one or more of the following advantages. First, some new dispersions have better durability. Certain dispersions exhibit improved adhesion properties and others may have improved adhesion as well as good toughness and durability. Other dispersions are easier to process in a melt-extrusion process. In particular, some dispersions are easier to process due to the low melting point of the polymers used therein. Some dispersions have the feature of being low yellowing. Other characteristics and additional advantages are apparent to those skilled in the art.

Example 7

Polyester resin (Reichhold Fine-tone T-382-ES, acid number 21 mg KOH/g) was melted at 150° C. and fed into a rotor-stator mixer at 50 g/min. 25% (w/w) KOH solution was fed at 2.1 g/min and blended with additional water pumped at a rate 30 g/min and injected into the mixer to create the emulsion. The mixer speed was set at ~750 rpm. The resulting emulsion was fed to a second rotor-stator mixer (mixer speed set at ~500 rpm) where an additional 50 g/min of water was added. In this way the emulsion was diluted and cooled to less than 100° C. before exiting the mixing system into a collection vessel. The properties of the resulting dispersion can be found in Table 1.

Example 8

Polyester resin (Reichold Fine-tone T-382-ES-HMW, acid number 18 mg KOH/g) was melted at 160° C. and fed into a rotor-stator mixer at 50 g/min 30% (w/w) KOH solution was fed at 1.1 g/min and blended with additional water pumped at a rate 16.5 g/min and injected into the mixer to create the emulsion. The mixer speed was set at ~800 rpm. The resulting emulsion was fed to a second rotor-stator mixer (mixer speed set at ~500 rpm) where an additional 55 g/min of water was added. In this way the emulsion was diluted and cooled to less than 100° C. before exiting the mixing system into a collection vessel. The properties of the resulting dispersion can be found in Table 1.

| Resin | Particle Size Dv (microns) | Solids (%) | Starting Powder Mw | Dispersion Mw (Δ) | pH |
|---|---|---|---|---|---|
| Fine-Tone T-382-ES | 0.11 | 38 | 13200 | 12400 (~6%) | 6.6 |
| Fine-Tone T-382-ES-HMW | 0.23 | 42 | 37800 | 35800 (~5%) | 6.7 |

While the invention has been described with respect to a limited number of embodiments, the specific features of one embodiment should not be attributed to other embodiments of the invention. No single embodiment is representative of all aspects of the inventions. Moreover, variations and modifications therefrom exist. For example, the dispersions described herein may comprise other components. Various additives may also be used to further enhance one or more properties. In some embodiments, the dispersions are substantially free of any additive not specifically enumerated herein. Some embodiments of the dispersions described herein consist of or consist essentially of the enumerated components. In addition, some embodiments of the methods described herein consist of or consist essentially of the enumerated steps. The appended claims intend to cover all such variations and modifications as falling within the scope of the invention.

What is claimed is:

1. An aqueous dispersion consisting essentially of (A) from 35 to 65 percent by weight of one or more polyesters; and (B) optionally one or more dispersing agents and (C) at least 30% by weight of water; wherein the dispersion has a pH in the range of from 6 to 9, a volume average particle size diameter in the range of from 0.05 to 5 μm.

2. The dispersion according to claim 1, wherein the dispersion has a volume average particle size in the range of from 0.05 to 0.5 μm.

\* \* \* \* \*